(12) United States Patent
Watanabe et al.

(10) Patent No.: US 7,469,315 B2
(45) Date of Patent: Dec. 23, 2008

(54) STORAGE CONTROLLER, AND METHOD OF CONTROLLING STORAGE CONTROLLER TO IMPROVE THE RELIABILITY OF THE STORAGE CONTROLLER

(75) Inventors: Yasuo Watanabe, Kawasaki (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 344 days.

(21) Appl. No.: 11/345,097

(22) Filed: Jan. 31, 2006

(65) Prior Publication Data

US 2007/0143542 A1   Jun. 21, 2007

(30) Foreign Application Priority Data

Dec. 16, 2005   (JP) .............................. 2005-362734

(51) Int. Cl.
*G06F 12/00* (2006.01)
*G06F 13/00* (2006.01)
*G06F 13/28* (2006.01)
*G06F 1/26* (2006.01)
*G06F 1/32* (2006.01)

(52) U.S. Cl. .................... 711/114; 711/161; 713/320
(58) Field of Classification Search ........................ None
See application file for complete search history.

(56) References Cited

U.S. PATENT DOCUMENTS

| 5,954,820 | A  | * | 9/1999  | Hetzler ......................... 713/323 |
| 6,766,430 | B2 |   | 7/2004  | Arakawa et al. |
| 6,834,289 | B2 | * | 12/2004 | Kaneda et al. .............. 707/204 |
| 6,895,483 | B2 |   | 5/2005  | Eguchi et al. |
| 2003/0221063 | A1 | * | 11/2003 | Eguchi et al. ............... 711/114 |
| 2003/0225861 | A1 |   | 12/2003 | Iwamura et al. |
| 2004/0054939 | A1 |   | 3/2004  | Guha et al. |
| 2005/0193167 | A1 |   | 9/2005  | Eguchi et al. |
| 2005/0273638 | A1 | * | 12/2005 | Kaiju et al. .................. 713/323 |
| 2005/0289368 | A1 | * | 12/2005 | Chang et al. ................. 713/300 |

FOREIGN PATENT DOCUMENTS

| JP | 2002-157091 | 5/2002 |
| JP | 2003-044328 | 2/2003 |

OTHER PUBLICATIONS

Carrera et al., Conserving Disk Energy in Network Servers, Jun. 2003, ACM Digital Library, pp. 86-97.*

* cited by examiner

*Primary Examiner*—Kevin L Ellis
*Assistant Examiner*—Chad L Davidson
(74) *Attorney, Agent, or Firm*—Sughrue Mion, PLLC

(57) ABSTRACT

The present invention controls supply of power to a storage device on the basis of an access status, moves a logical storage device between physical storage devices having different power supply modes, reduces energization time, and improves the reliability. A relocation plan creation portion creates a relocation plan by disposing a logical volume with high access frequency in a RAID group which is in a long-time energization mode, disposing a logical volume with moderate access frequency in a RAID group which is in a first short-time energization mode, and disposing a logical volume with low access frequency in a RAID group which is in a second short-time energization mode. An execution time determination portion determines an execution time for executing the relocation plan, on the basis of the access frequency to the RAID groups. The volumes with higher access frequency are disposed in the RAID group in which the power supply time is long, and the volumes with lower access frequency are disposed in the RAID group in which the power is supplied in an on-demand fashion.

19 Claims, 26 Drawing Sheets

FIG. 6

RAID GROUP ACCESS PATTERN MANAGEMENT TABLE (131)

| TIME ZONE | ACCESS INFORMATION | | |
| --- | --- | --- | --- |
| | RAIDGROUP #1 | RAIDGROUP #2 | ... |
| T1-T2 | THERE IS ACCESS | – | ... |
| T2-T3 | THERE IS ACCESS | – | ... |
| T2-T3 | THERE IS ACCESS | – | ... |
| T3-T4 | – | – | ... |
| ... | ... | ... | ... |

FIG. 7

LU ACCESS PATTERN MANAGEMENT TABLE (132)

| TIME ZONE | ACCESS INFORMATION | | |
| --- | --- | --- | --- |
| | LU #1 | LU #2 | ... |
| T1-T2 | THERE IS ACCESS | – | ... |
| T2-T3 | THERE IS ACCESS | – | ... |
| T3-T4 | THERE IS ACCESS | – | ... |
| T4-T5 | – | – | ... |
| ... | ... | ... | ... |

FIG. 8

RAID GROUP MANAGEMENT TABLE 133

| RAID GROUP # | FREE SPACE (GB) | TOTAL SIZE (GB) | POWER CONTROL ATTRIBUTE | POWER STATE | CORRESPONDING LU # | CORRESPONDING DRIVE # |
|---|---|---|---|---|---|---|
| 1 | 100 | 1000 | CONSTANT ENERGIZATION | ON | 1,2,3,4 | 1,2,3,4 |
| 2 | 200 | 1000 | CONSTANT ENERGIZATION | ON | 5,6 | 5,6,7,8 |
| 3 | 0 | 1000 | CONSTANT ENERGIZATION | ON | 7,8,9 | 9,10,11,12 |
| ... | ... | ... | ... | ... | ... | ... |

FIG. 9

HIERARCHY CONTROL PLAN TABLE — 134

| TRANSFER # | SOURCE LU # | DESTINATION LU # | TRANSFER TIME |
|---|---|---|---|
| 1 | 5 | 9 | T11 |
| 2 | 6 | 10 | T12 |
| ... | ... | ... | ... |

FIG. 10

LU MANAGEMENT TABLE — 135

| LU # | CORRESPONDING RAID GROUP # | SIZE (GB) | COUPLED LU # | CONSTANT ENERGIZATION FLAG |
|---|---|---|---|---|
| 1 | 1 | 100 | – | ON |
| 2 | 1 | 300 | 3,5 | OFF |
| 3 | 1 | 100 | – | OFF |
| 4 | 1 | 100 | – | OFF |
| 5 | 1 | 100 | – | OFF |
| 6 | 2 | 100 | – | OFF |
| ... | ... | ... | ... | ... |

FIG. 11

HOST LU MANAGEMENT TABLE — 136

| HOST LU # | CORRESPONDING LU # | CORRESPONDING HOST |
|---|---|---|
| 1 | 1 | H1 |
| 2 | 2 | H1 |
| 3 | 4 | H1 |
| 4 | 6 | H2 |
| ... | ... | ... |

FIG. 12

THRESHOLD MANAGEMENT TABLE — 137

| CONSTANT ENERGIZATION THRESHOLD | TH1% |
|---|---|
| LONG-TIME OFF THRESHOLD | TH2% |

STORAGE CONTROLLER, AND METHOD OF CONTROLLING STORAGE CONTROLLER TO IMPROVE THE RELIABILITY OF THE STORAGE CONTROLLER

CROSS-REFERENCE TO RELATED APPLICATIONS

This application relates to and claims priority from Japanese Patent Application No. 2005-362734 filed on Dec. 16, 2005, the entire disclosure of which is incorporated herein by reference.

BACKGROUND OF THE INVENTION

The present invention relates to a storage controller and a method of controlling the storage controller.

The storage controller is constructed such that the storage devices such as hard disk drives and the like are disposed therein in the form of an array, and provides a host computer (sometimes referred to as "host" hereinafter) with a storage region based on, for example, RAID (Redundant Array of Independent Disks). At least one logical volume (logical storage device) is formed on a physical storage region (physical storage device) which is provided by a group of storage devices, and the host is provided with this logical volume. The host reads and writes data with respect to the logical volume by transmitting a predetermined command.

Due to various regulations, the business organizations and the like need to save various data such as e-mail data, contract data, sales data, and customer data for a certain period of time. When the data is required for an audit, the saved data have to be accessed immediately.

Tape devices are used relatively widely in order to save a large amount of data. However, when using the tape device, a magnetic tape stored with desired data needs to be carried away from a storehouse and set in a reader, thus it is not possible to promptly access the saved data.

Recently, SATA (Serial AT Attachment) disks comprising SATA interfaces started to become prevalent as relatively inexpensive hard disk drives. Therefore, storage controllers that use the SATA disks instead of the tape devices as the device for saving data are coming in.

However, the SATA disks are not as reliable as the FC (Fiber Channel) disks with the FC interfaces, thus there is room for improvement in the SATA disks in terms of the availability of the storage controller. Therefore, there is proposed a technology of individually performing ON-OFF control on the powers of the hard disk drives that are installed in the storage controller (U.S. Patent Application Laid-Open No. 2004-0054939).

In the technology described in the abovementioned patent literature, the power of the disk drive is switched ON when the disk drive is used, and the power is switched OFF when the disk drive is not used, whereby the energization time in the hard disk drive can be reduced to improve the reliability of the storage controller.

However, the host does not access the data while being aware of each of the disk drives, but accesses the data by considering the logical volume as the target of access. Further, a plurality of types of logical volumes with different characteristics are sometimes set in the same group of disk drives. Therefore, simply switching the powers ON and OFF the disk drives individually is unlikely to reduce the energization time in each of the hard disk drives.

For example, when the logical volume which stores frequently-accessed data, and the logical volume which stores infrequently-accessed data use the same group of disk drives, there is less opportunity to turn off the powers of the group of disk drives. The conventional technologies do not sufficiently consider the characteristics or arrangement of the data stored in the disk drives, thus it is difficult to reduce the energization time (operating time) in the disk drives.

SUMMARY OF THE INVENTION

The present invention is contrived in view of above problems, and an object thereof is to provide a storage controller and a method of controlling the storage controller in which the energization time for the storage devices can be reduced to improve the reliability of the storage controller. Another object of the present invention is to provide a storage controller and a method of controlling the storage controller in which supply of the power of each storage device is controlled on the basis of the access status of a physical storage device, and a logical storage device is moved between the physical storage devices having different power supply modes on the basis of the access status of the logical storage device, whereby the energization time in each of the storage devices can be reduced, the reliability of the storage controller can be improved, and electricity consumption is reduced. Yet another object of the present invention will be apparent from the description of embodiments provided hereinafter.

In order to achieve the above objects, the storage controller according to an aspect of the present invention is connected to at least one host device and a plurality of storage devices, the storage controller comprising: a plurality of physical storage devices, each of which is configured from storage regions of a predetermined number of storage devices among the plurality of storage devices; at least one logical storage device which can be set in the storage region of each of the physical storage devices; an access information collection portion which collects access information about each of the physical storage devices and each of the logical storage devices on the basis of the status of access from the host device to each of the logical storage devices; a power supply mode setting portion which sets a power supply mode for supplying power for each of the physical storage devices on the basis of the access information about each of the physical storage devices; a power control portion which controls supply of power to each of the storage devices configuring each of the physical storage devices, on the basis of the set power supply mode; a relocation plan creation portion which creates a relocation plan for moving each of the logical storage devices between the physical storage devices having different power supply modes, on the basis of the access information about each of the logical storage devices; an execution time determination portion which sets an execution time for executing the created relocation plan; and a relocation execution portion which moves a logical storage device, which is judged as a target of relocation from among the logical storage devices, from a source physical storage device to a destination physical storage device, on the basis of the created relocation plan, when the determined execution time comes.

The storage devices store user data and the like which are used in the host device, and the examples of the storage devices include a hard disk drive, semiconductor memory drive, optical disk drive, magneto-optical disk drive, and the like.

Depending on the RAID levels, the physical storage devices are configured from a predetermined number of storage devices. For example, a physical storage region comprising a redundant structure can be created using a plurality of, such as three or five, data disks and one parity disk. Storage regions that are formed on the storage regions that the plurality of storage devices respectively have are called "RAID group" or "physical storage devices" in the present specification. The physical storage device can be provided with one or plurality of logical storage devices. The logical storage device is a target of access from the host device, and is sometimes called "logical volume." For example, by sectioning the physical storage device into a predetermined size, a plurality of logical storage devices can be set. Specifically, for example, when a physical storage device with a total capacity of 1000 GB (=250×4) is created using four 250 GB data disks and one parity disk, a total of five 200 GB logical storage devices can be set.

The host device then takes the logical storage devices as the target of access, and reads and writes the data. The host device issues a read command when reading the data, and issues a write command when writing the data.

The access information collection portion detects a command (access request) issued by the host device, thereby collecting access information indicating when and whether the access request is generated in each of the logical storage devices. Further, since each logical storage device is provided in the physical storage device as described above, the access information collection portion can collect the access information (when an access is made, and the like) for each of the physical storage devices by detecting the access request for accessing each logical storage device.

The power supply mode setting portion sets a power supply mode for each of the physical storage devices on the basis of the access information about each of the physical storage devices. For example, the power supply mode setting portion can set a mode for a constant energization of the physical storage devices that are accessed relatively frequently, and can set a mode for stopping supply of the power to the physical storage devices that are accessed infrequently. The power control portion controls the supply of power to each of the physical storage devices according to the power supply modes that are previously set as above.

Furthermore, the relocation plan creation portion creates a relocation plan for moving each of the logical storage devices between the physical storage devices having different power supply modes, on the basis of the access information about each of the logical storage devices. In other words, the relocation plan creation portion creates a plan for carrying out a data migration in accordance with a status of accessing the logical storage devices.

For example, the relocation plan creation portion can create a plan for locating the logical storage devices having frequently-accessed data in the physical storage devices that are energized constantly or for a long period of time. Moreover, the relocation plan creation portion can create a plan for locating the logical storage devices having infrequently-accessed data in the physical storage devices that are energized only when necessary.

The execution time determination portion determines an execution time for executing the relocation plans. For example, the execution time determination portion can select an execution time by judging the time zone where data relocation does not affect the performance of the storage controller. Then, when a determined time comes, the relocation execution portion moves the logical storage device from a source physical storage device to a destination physical storage device.

By relocating the logical storage devices, the logical storage devices are brought together in the physical storage devices that are set to a predetermined power supply mode, for each type of the access status (access pattern). For example, the frequently-accessed logical storage devices are brought together in the physical storage devices that are energized for relatively long period of time, and the infrequently-accessed logical storage devices brought together in the physical storage devices that are energized only when necessary. Therefore, it is possible to minimize unwanted power supply to the physical storage devices, to reduce the possibility that the storage devices fail, to improve the reliability of the storage controller, and to reduce electricity consumption on the storage controller.

In an embodiment of the present invention, the relocation plan creation portion creates relocation plans such that the logical storage device, which is judged unlikely to be accessed from the host device, is caused to move to the physical storage device that is set to a power supply mode where a power supply time period is relatively short.

In an embodiment of the present invention, the relocation plan creation portion creates relocation plans such that the logical storage device, which is judged to be accessed from the host device frequently, is caused to move to the physical storage device that is set to a power supply mode where a power supply time period is relatively long.

In an embodiment of the present invention, the power supply mode setting portion calculates an access frequency to each of the physical storage devices on the basis of the access information about each of the physical storage devices. The power supply mode setting portion sets a long-time energization mode, where a power supply time period is relatively long, for each of the storage devices configuring the physical storage device in which the calculated access frequency is relatively high, and sets a short-time energization mode, where a power supply time period is relatively short, for each of the storage devices configuring the physical storage device in which the calculated access frequency is relatively low.

In an embodiment of the present invention, the relocation plan creation portion calculates an access frequency to each of the logical storage devices on the basis of the access information about each of the logical storage devices. The relocation plan creation portion creates relocation plans by selecting a physical storage device, which is set to the long-time energization mode, as a destination of the logical storage device in which the calculated access frequency is relatively high, and selecting a physical storage device, which is set to the short-time energization mode, as a destination of the logical storage device in which the calculated access frequency is relatively low.

In an embodiment of the present invention, when there are a plurality of physical storage devices with a power supply mode, which are selected as the destination, the relocation plan creation portion selects, from the plurality of physical storage devices, a physical storage device that has an access pattern which matches most with an access pattern for accessing the logical storage device as a destination physical storage device, on the basis of the access information about each of the physical storage devices and the access information about each of the logical storage devices.

In an embodiment of the present invention, the short-time energization mode is set as a mode of supplying power only when access is requested from the host device.

In an embodiment of the present invention, the short-time energization mode comprises a first short-time energization mode and a second short-time energization time mode in which the power supply time period is relatively shorter than that in the first short-time energization mode.

In an embodiment of the present invention, the power supply mode setting portion can set, on the basis of the access information about each of the physical storage devices, at least three power supply modes of a long-time energization mode of performing constant energization, a first short-time energization mode in which energization is performed only in a predetermined situation, and a second short-time energization mode in which the power supply time period is relatively shorter than that in the first short-time energization mode. Moreover, the relocation plan creation portion calculates an access frequency to each of the logical storage devices on the basis of the access information about each of the logical storage devices. (1) When the access frequency calculated for the logical storage device is at least a first threshold which is set in advance, the relocation plan creation portion selects a physical storage device, which is set to the long-time energization mode, as a destination of this logical storage device. (2) When the access frequency calculated for the logical storage device is between the first threshold and a second threshold which is set in advance (first threshold>second threshold), the relocation plan creation portion selects a physical storage device, which is set to the first short-time energization mode, as a destination of this logical storage device. (3) When the access frequency calculated for the logical storage device is less than the second threshold, the relocation plan creation portion selects a physical storage device, which is set to the second short-time energization mode, as a destination of this logical storage device.

In an embodiment of the present invention, the power control portion stops supply of power to each of the storage devices configuring a physical storage device which is not accessed for a predetermined amount of time or longer, on the basis of the access information about each of the physical storage devices.

In an embodiment of the present invention, when an access to the physical storage device that is no longer supplied with power, is detected, the power control portion supplies power to each of the storage devices configuring this physical storage device.

In an embodiment of the present invention, the execution time determination portion refers to the access information about the source physical storage device and the access information about the destination physical storage device to detect a low load time zone where the access frequency to the source physical storage device and the destination physical storage device becomes relatively low, and then sets an execution time in the detected low load time zone.

In an embodiment of the present invention, the execution time determination portion sets an execution time in a common time zone in which a low load time zone related to the source physical storage device and a low load time zone related to the destination physical storage device overlap each other, the common time zone being a time zone which has a length equal to or longer than a transfer time period required for transferring the data stored in a logical storage device which is a target of relocation.

In an embodiment of the present invention, in the case of generating a new logical storage device, the physical storage device which is set to the long-time energization mode is selected.

In an embodiment of the present invention, when specification information for specifying a type of physical storage device to which a logical storage device should belong is set for the logical storage device, a physical storage device in which the logical storage device is disposed is fixed to a physical storage device having the power supply mode which is indicated in the specification information.

In an embodiment of the present invention, when specification information, which is used for fixing a destination for disposing the logical storage device to the physical storage device which is set to the long-time energization mode, is previously set in the logical storage device, the relocation plan creation portion fixes the destination for disposing the logical storage device in which the specification information is set, to the physical storage device, which is set to the long-time energization mode, so that the logical storage specification information is set, to the physical storage device, which is set to the long-time energization mode, so that the logical storage device does not move to the physical storage device that is set to the short-time energization mode.

In an embodiment of the present invention, the specification information can be set from an external computer terminal.

The storage controller according to another aspect of the present invention comprises: a host communication interface portion for carrying out communication between the storage controller and a host device; a sub communication interface portion for carrying out communication between the storage controller and a plurality of storage devices; a control portion which controls data exchange between the host devices and each of the storage devices by using the host communication interface portion and the sub communication interface portion; a plurality of physical storage devices, each of which is configured from a storage region of a predetermined number of storage devices among the plurality of storage devices; and at least one logical storage device which can be set in the storage region of each of the physical storage devices.

In addition, (1) the control portion comprises: (1-1) an access information collection portion which collects access information about each of the physical storage devices and each of the logical storage devices on the basis of the status of access to each of the logical storage devices from the host device; (1-2) a power supply mode setting portion which sets a power supply mode for supplying power for each of the physical storage devices on the basis of the access information about each of the physical storage devices; (1-3) a power control portion which controls supply of power to each of the storage devices configuring each of the physical storage devices, on the basis of a set power supply mode; (1-4) a relocation plan creation portion which creates a relocation plan for moving each of the logical storage devices between the physical storage devices having different power supply modes, on the basis of the access information about each of the logical storage devices; (1-5) an execution time determination portion which sets an execution time for executing a created relocation plan; and (1-6) a relocation execution portion which moves a logical storage device, which is judged as a target of relocation from among the logical storage devices, from a source physical storage device to a destination physical storage device on the basis of a created relocation plan, when the determined execution time comes.

Further, (2) the power supply mode setting portion calculates an access frequency to each of the physical storage devices on the basis of the access information about each of the physical storage devices. The power supply mode setting portion (2-1) sets a long-time energization mode, where a power supply time period is relatively long, for each of the storage devices configuring the physical storage device in which the calculated access frequency is relatively high, and (2-2) sets a short-time energization mode, where a power supply time period is relatively short, for each of the storage devices configuring the physical storage device in which the calculated access frequency is relatively low.

Furthermore, (3) the relocation plan creation portion calculates an access frequency to each of the logical storage devices on the basis of the access information about each of the logical storage devices, to create a relocation plans by:

(3-1) selecting a physical storage device, which is set to the long-time energization mode, as a destination of the logical storage device in which the calculated access frequency is relatively high; (3-2) selecting a physical storage device, which is set to the short-time energization mode, as a destination of the logical storage device in which the calculated access frequency is relatively low; and (3-3) when there are a plurality of physical storage devices with a power supply mode, which are selected as the destination, selecting, from the plurality of physical storage devices, a physical storage device having an access pattern which matches most with an access pattern for accessing the logical storage device, on the basis of the access information about each of the physical storage devices and the access information about each of the logical storage devices.

(4) The power control portion (4-1) stops supply of power to each of the storage devices configuring a physical storage device which is not accessed for a predetermined amount of time or longer, on the basis of the access information about each of the physical storage devices, and, (4-2) supplies power to each of the storage devices configuring the physical storage device when an access to the physical storage device which is no longer supplied with power is detected. (5) The execution time determination portion refers to access information about the source physical storage device and access information about the destination physical storage device to set an execution time in a common time zone in which a low load time zone related to the source physical storage device and a low load time zone related to the destination physical storage device overlap each other, the common time zone being a time zone which has a length equal to or longer than a transfer time period required for transferring the data stored in the logical storage device which is a target of relocation.

A method of controlling a storage controller according to yet another aspect of the present invention is a method of controlling the storage controller which is connected to at least one host device and a plurality of storage devices, wherein the storage controller is provided with a plurality of physical storage devices, each of which is configured from a storage region of a predetermined number of storage devices among the plurality of storage devices, and at least one logical storage device which can be set in the storage region of each of the physical storage devices, and the method comprises the steps of: processing an access request for accessing each of the logical storage devices from the host device in response to a command received from the host device; collecting access information about each of the physical storage devices and about each of the logical storage devices on the basis of the access request; setting a power supply mode for supplying power for each of the physical storage devices on the basis of the access information about each of the physical storage devices; controlling supply of power to each of the storage devices configuring each of the physical storage devices, on the basis of a set power supply mode; creating a relocation plan for moving each of the logical storage devices between the physical storage devices having different power supply modes, on the basis of the access information about each of the logical storage devices; setting an execution time for executing a created relocation plan; and moving a logical storage device, which is judged as a target of relocation from among the logical storage devices, from a source physical storage device to a destination physical storage device on the basis of the created relocation plan, when a determined execution time comes.

At least a part of the configuration of the present invention can be configured as a computer program which is executed by a computer system. The computer program can be, for example, fixed to various storage media and distributed, or can be transmitted via a communication network.

BRIEF DESCRIPTION OF THE DRAWINGS

FIG. 6 is an explanatory diagram showing a RAID group access pattern management table;

FIG. 7 is an explanatory diagram showing a LU access pattern management table;

FIG. 8 is an explanatory diagram showing a RAID group management table;

FIG. 9 is an explanatory diagram showing a hierarchy control plan table;

FIG. 10 is an explanatory diagram showing a LU management table;

FIG. 11 is an explanatory diagram showing a host LU management table;

FIG. 12 is an explanatory diagram a threshold management table;

DESCRIPTION OF THE SPECIFIC EMBODIMENTS

Figure 1:
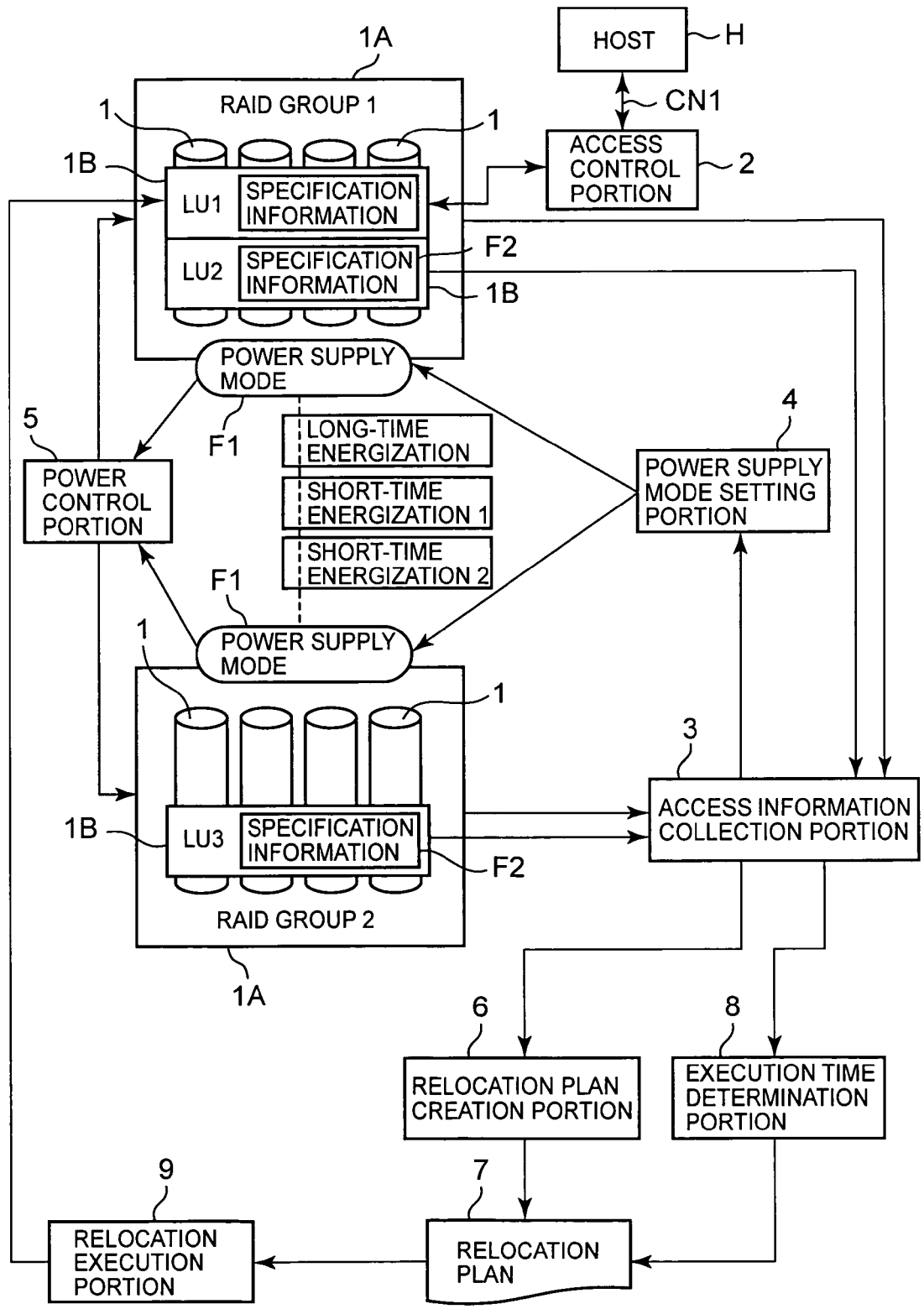
FIG. 1 is an explanatory diagram showing an outline of the embodiments of the present invention.

FIG. 1 is a configuration explanatory diagram showing an entire outline of the embodiments of the present invention. In this embodiment, an appropriate power control is carried out in accordance with a usage of each RAID group, and logical volumes are disposed appropriately among a plurality of RAID groups having different power supply modes, as will be described hereinafter. In the present embodiment, by carrying out such hierarchy control, the operating time of a disk drive can be reduced as much as possible to increase the life of the disk drive. As a result, the reliability of the storage controller and electricity consumption on the storage controller can be improved.

FIG. 1 shows a configuration of a main function of the storage controller. The storage controller can comprise, for example, a plurality of disk drives 1, an access control portion 2, an access information collection portion 3, a power supply mode setting portion 4, a power supply control portion 5, a relocation plan creation portion 6, an execution time determination portion 8, and a relocation execution portion 9. Here, the access control portion 2, access information collection portion 3, power supply mode setting portion 4, power supply control portion 5, relocation plan creation portion 6, execution time determination portion 8, and relocation execution portion 9 can be realized as a function of a controller having a microcomputer.

The disk drive 1 corresponds to a "storage device." The disk drive 1 is not necessarily a type of storage device which rotates the disk. For example, the disk drive 1 can be configured as with a hard disk drive, a semiconductor memory drive, and the like.

Combining storage regions that the disk drives 1 respectively have forms a RAID group 1A. The RAID group 1A corresponds to a "physical storage device." As a RAID level, for example, RAID 1, RAID 5, and the like are relatively known. The RAID group 1A is provided with a logical volume (LU: Logical Unit Number) 1B. This logical volume 1B corresponds to a "logical storage device."

A host computer (referred to as "host" hereinafter) H is connected to the access control portion 2 of the storage controller via a communication network CN1 such as SAN (Storage Area Network) or LAN (Local Area Network). The host H accesses a predetermined logical volume 1B to read and write data by specifying information (LUN or the like) for identifying the logical volume 1B or a logical block address. A read command and a write command that are issued from the host H are processed by the access control portion 2.

It should be noted that when the access control portion 2 comprises a file system the host H can access the access control portion 2 at a file level.

The access information collection portion 3 detects an access request, which is processed by the access control portion 2 and sent from the host H, and collects access information about the RAID group 1A and the logical volume 1B.

The power supply mode setting portion 4 sets a power supply mode F1 for each RAID group 1A on the basis of the access information about the RAID group 1A, the access information being produced by the access information collection portion 3. As the power supply mode F1, a plurality of types of modes such as a long-time energization mode, a first short-time energization mode, and a second short-time energization mode are provided.

The power control portion 5 control energization on each of the disk drives 1 configuring each RAID group 1A, on the basis of the power supply mode F1 which is previously set in each RAID group 1A. Control of energization means that a case in which power is supplied (power ON) and a case in which supply of power is stopped (power OFF) are switched in accordance of the presence of the access request sent from the host H.

The long-time energization mode is a mode for performing energization on each of the disk drives 1 configuring each RAID group 1A for a long period of time as in the case of constant energization. The first short-time energization mode and the second short-time energization time mode are modes for performing energization on each of the disk drives 1 configuring each RAID group 1A, only when the access request is sent from the host H. A logical volume 1B in which access frequency is moderate is disposed in a RAID group 1A which is set to the first short-time energization mode, and a logical volume 1B in which access frequency is least is disposed in a RAID group 1A which is set to the second short-time energization mode. Therefore, in accordance with the difference in the access frequency, a disk drive 1, which belongs to the RAID group 1A which is set to the first short-time energization mode, has more chances to be energized, compared to a disk drive 1, which belongs to the RAID group 1A which is set to the second short-time energization mode.

The relocation plan creation portion 6 creates a relocation plan 7 for optimizing the position of the logical volume 1B inside the storage controller, in the light of minimizing unwanted energization of each disk drive 1. For example, the relocation plan creation portion 6 creates the relocation plan 7 by disposing the logical volume 1B with high access frequency in the RAID group 1A which is set to the long-time energization mode, disposing the logical volume 1B with moderate access frequency in the RAID group 1A which is set to the first short-time energization mode, and disposing the logical volume 1B with low access frequency in the RAID group 1A which is set to the second short-time energization mode. The created relocation plan 7 is temporarily stored in a memory inside the storage controller.

The execution time determination portion 8 determines, beforehand, a time for executing the relocation plan 7 on the basis of the access frequency to the RAID group 1A. The execution time determination portion 8 compares the access frequency to the RAID group 1A provided with a source logical volume 1B (source RAID group 1A), with the access frequency to the RAID group 1A provided with a destination logical volume 1B (destination RAID group 1A). The execution time determination portion 8 then selects a time zone in which the access frequency (load) to both source RAID group 1A and destination RAID group 1A is low, and creates an execution time for executing the relocation plan 7.

The relocation execution portion 9 compares a present time, which is acquired from a timer inside the storage controller or from a time information supply server that exists externally, with an execution time which is registered in the relocation plan 7, and, when the execution time comes, executes the relocation plan 7. Specifically, the relocation execution portion 9 transfers the data, which is stored in the source logical volume 1B registered in the relocation plan 7, to the destination logical volume 1B registered in the relocation plan 7 to copy the data.

When copying the data is completed, the data stored in the source logical volume 1B does not have to be kept. Therefore, the source logical volume 1B can be formatted and allocated to other application program of other host H. Moreover, as to the destination logical volume 1B, path information or the like between the destination logical volume 1B and the host H is set in order to continuously accept access from the host H in which the source logical volume 1B was used.

Here, specification information F2 can be set in each logical volume 1B. The specification information F2 is information for specifying a type of RAID group 1A which should be provided with the logical volume 1B. Therefore, the specification information F2 can be referred to as, for example, "assignment destination specification information," "assignment destination fixed information," or the like. The specification information F2 can be set by manual operation by a user via, for example, a management terminal which is connected to the storage controller.

The relocation plan creation portion 6 does not consider the logical volume 1B in which the specification information F2 is previously set, as a target of relocation. Specifically, the logical volume 1B in which an assignment destination is fixed by the specification information F2 is not described in the relocation plan 7. Therefore, the user can fix a desired logical volume 1B to a desired RAID group 1A without being affected by the level of access frequency.

For example, the logical volume 1B, which is set to the long-time energization mode by the specification information F2, can be provided only in the RAID group 1A which is set to the long-time energization mode, and is not moved to the RAID group 1A which is set to the first short-time energization mode or the second short-time energization mode.

Similarly, the logical volume 1B, which is specified to the first short time energization mode by the specification information F2, can be provided only in the RAID group 1A which is set to the first short-time energization mode, and is not moved to the RAID group 1A which is set to the long-time energization mode or the second short-time energization mode. Similarly, the logical volume 1B, which is specified to the second short-time energization mode by the specification information F2, can exist only in the RAID group 1A which is set to the second short-time energization mode, and is not moved to the RAID group 1A which is set to the long-time energization mode or the first short-time energization mode.

Therefore, for example, the user can secure immediate access by setting the long-time energization mode for the logical volume 1B which stores important data that the user wishes to access immediately when necessary. Furthermore, for example, the user can also specify either the first short-time energization mode or the second short-time energization mode for the logical volume 1B which stores archive data such as e-mail data. Therefore, data migration can be prevented from being executed by a temporal use of the logical volume, and unwanted energization of each disk drive 1 storing the archive data can be minimized.

In the present embodiment, a configuration is made such that power supply is controlled by setting power supply modes for the RAID groups 1A respectively on the basis of the access information related to each of the RAID group 1A, and that the relocation plan 7 for moving each logical volume 1B between the RAID groups 1A having different power supply modes is created on the basis of the access information related to each logical volume 1B.

Therefore, the logical volume 1B can be disposed in the RAID group 1A which is appropriate for usage (access status) of the logical volume 1B. Accordingly, unwanted energization is prevented from being carried out on each of the disk drives 1 configuring the RAID group 1A, the life of each of the disk drives 1 can be increased, the reliability of the storage controller can be improved, and electricity consumption on the storage controller can be reduced.

EMBODIMENT 1

Figure 2:
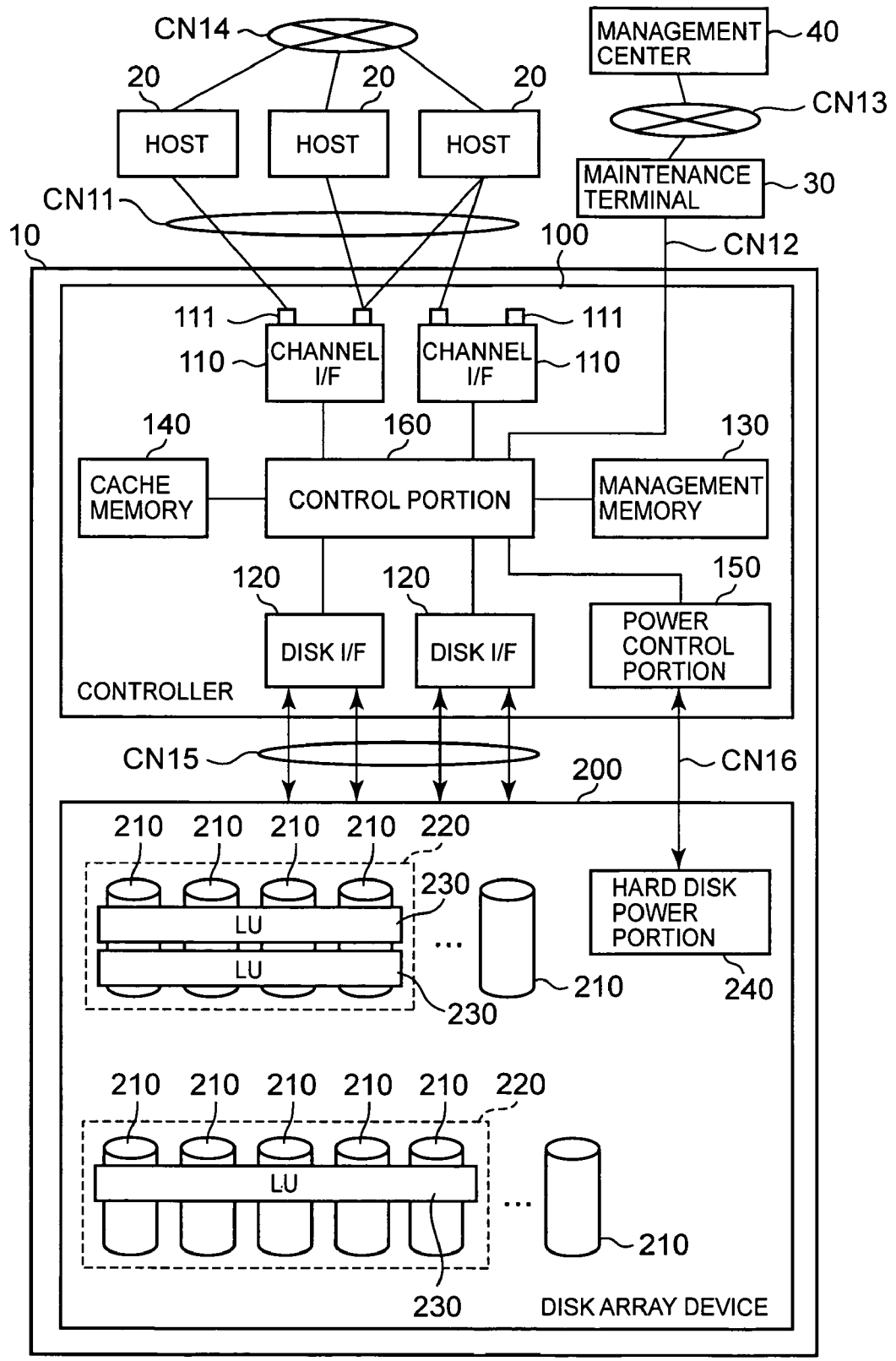
FIG. 2 is a block diagram showing an entire configuration of the storage controller.

The embodiments of the present invention are described in detail. To describe the relationship between the present embodiment and FIG. 1 first, the host H in FIG. 1 corresponds to a host 20 in FIG. 2, the disk drive 1 in FIG. 1 corresponds to a disk drive 210 in FIG. 2, the RAID group 1A in FIG. 1 corresponds to a RAID group 220 in FIG. 2, the logical volume 1B in FIG. 1 corresponds to a logical volume 230 in FIG. 2, and the power control portion 5 in FIG. 1 corresponds to a power control portion 150 and hard disk power portion 240 in FIG. 2. Other control functions shown in FIG. 1 are realized by a controller 100 as described hereinafter.

First of all, a network configuration of a storage system comprising a storage controller 10 is described. The storage controller 10 is connected to one or a plurality of hosts 20 via a communication network CN11. Further, the storage controller 10 is connected to a maintenance terminal 30 via a communication network CN12. The maintenance terminal 30 is connected to a management center 40 via a communication network CN13. The management center 40 and all of some of the hosts 20 may be connected to each other via a communication network CN14.

Here, examples of the communication network CN11 include SAN and LAN (including the Internet). Examples of the communication networks CN12, CN13, and CN14 include LAN. It should be noted that the types of communication protocols are merely an example, thus the present invention is not limited to these. Moreover, in FIG. 2 intermediary devices such as switches and the like are omitted for convenience of explanation, but a configuration in which connections are made via switches and the like may apply.

Each of the hosts 20 can be configured as, for example, a server machine, main frame machine or the like. Each of the hosts 20 can operate one or a plurality of applications programs such as an e-mail management software, customer management software, and inventory management software.

The maintenance terminal 30 can be configured as, for example, a notebook computer. The maintenance terminal 30 is placed in the vicinity of the storage controller 10 and is operated by a user (or a maintenance personnel). The user can check various status information, configurations and the like inside the storage controller 10 by means of the maintenance terminal 30.

The management center 40 is a computer device which is managed by, for example, a bender or the like of the storage controller 10. Information items from the storage controller 10 installed in various locations are brought together to the management center 40 automatically or manually.

The storage controller 10 can be roughly classified into, for example, the controller 100 and a disk array device 200. The controller 100 and disk array device 200 can be provided in the same chassis, or provided in different chassis respectively.

The controller 100 comprises, for example, a channel interface ("interface" is abbreviated as "I/F" hereinafter) 110, a disk I/F 120, a management memory 130, a cache memory 140, a power control portion 150, and a control portion 160.

The channel I/F 110 has one or more communication ports 111 so as to be connected to the communication network CN11. The channel I/F 110 is configured as a computer device having at least one or more processors. The channel I/F 110 is a device for controlling communications with the host 20. The channel I/F 110 writes the write data received from the host 20 into the cache memory 140. The channel I/F 110 transmits the data stored in the cache memory 140 to the host 20.

The disk I/F 120 is connected to each of the disk drives 210 of the disk array device 200 via a communication network CN 15 such as SAN. The disk I/F 120 controls communications with each of the disk drives 210. The disk I/F 120 is configured as a computer device comprising at least one or more processors. The disk I/F 120 reads the write data written into the cache memory 140, converts a logical address to a physical address, and thereafter writes the write data into a predetermined disk drive 210. The disk I/F 120 further reads data required from the host 20 from a predetermined disk drive 210, and stores the read data in the cache memory 140.

Various control information and management information required for controlling the operation of the storage controller 10 are stored in the management memory 130. A summary of the information stored in the management memory 130 is described hereinafter. The cache memory 140 stores therein the write data which is written from the host 20 and the read data which is read into the host 20. It should be noted that the management memory 130 and the cache memory 140 can be provided in the same memory package, or configured individually as separate memory packages. Alternatively, a part of each memory may be used as a storage region for storing management information, or a part of other component may be used to cache the data.

The power control portion 150 controls supply of power to each disk drive 210 by outputting a control signal to the hard disk power portion 240 which is provided inside the disk array device 200. The power control portion 150 can be provided inside the disk array device 200. The hard disk power portion 240 supplies power to each of the disk drives 210. The hard disk power portion 240 can be provided in each of the disk drives 210 or in each of the RAID groups 220. Moreover, a redundant configuration may be formed by providing a plurality of hard disk power portions 240 in each of the disk drives 210 or each of the RAID groups 220.

Numbers of disk drives 210 such as hard dirk drives can be mounted on the disk array device 200. Also, a combination of different types of disk drives 210 such as a SATA disk and FC disk can be mounted on the disk array device 200.

The RAID group 220 is configured by a predetermined numbers of disk drives 210. The user can appropriately set how many disk drives 210 to use to configure the RAID group 220, as well as the RAID level. One or plurality of logical volumes (also referred to as "LU" hereinafter) 230 can be provided in the RAID group 220 configuring the physical storage device. The logical volume 230 is a target of access from the host 20. Data that is used by the host 20 is stored in the logical volume 230. When a plurality of types of disk drives 210 are provided in the disk array device 200, each RAID group 220 is configured from the disk drive 210 of the same kind.

It should be noted that the configuration of the storage controller 10 is not limited to the configurations described above. For example, the control portion 160 can be eliminated to realize a control function, which is same as the control portion 160, by a joint operation of the channel I/F 110 and the disk I/F 120. Alternatively, the channel I/F 110 and the disk I/F 120 can be provided in a single communication control package respectively. Specifically, it is enough that the storage controller 10 has the basic function of accessing each disk drive 210 in response to an access request from the host 20 to read and write the data with respect to the disk drive 210, thus the concrete configuration of the storage controller 10 is not limited to the configuration shown in FIG. 2.

Figure 3:
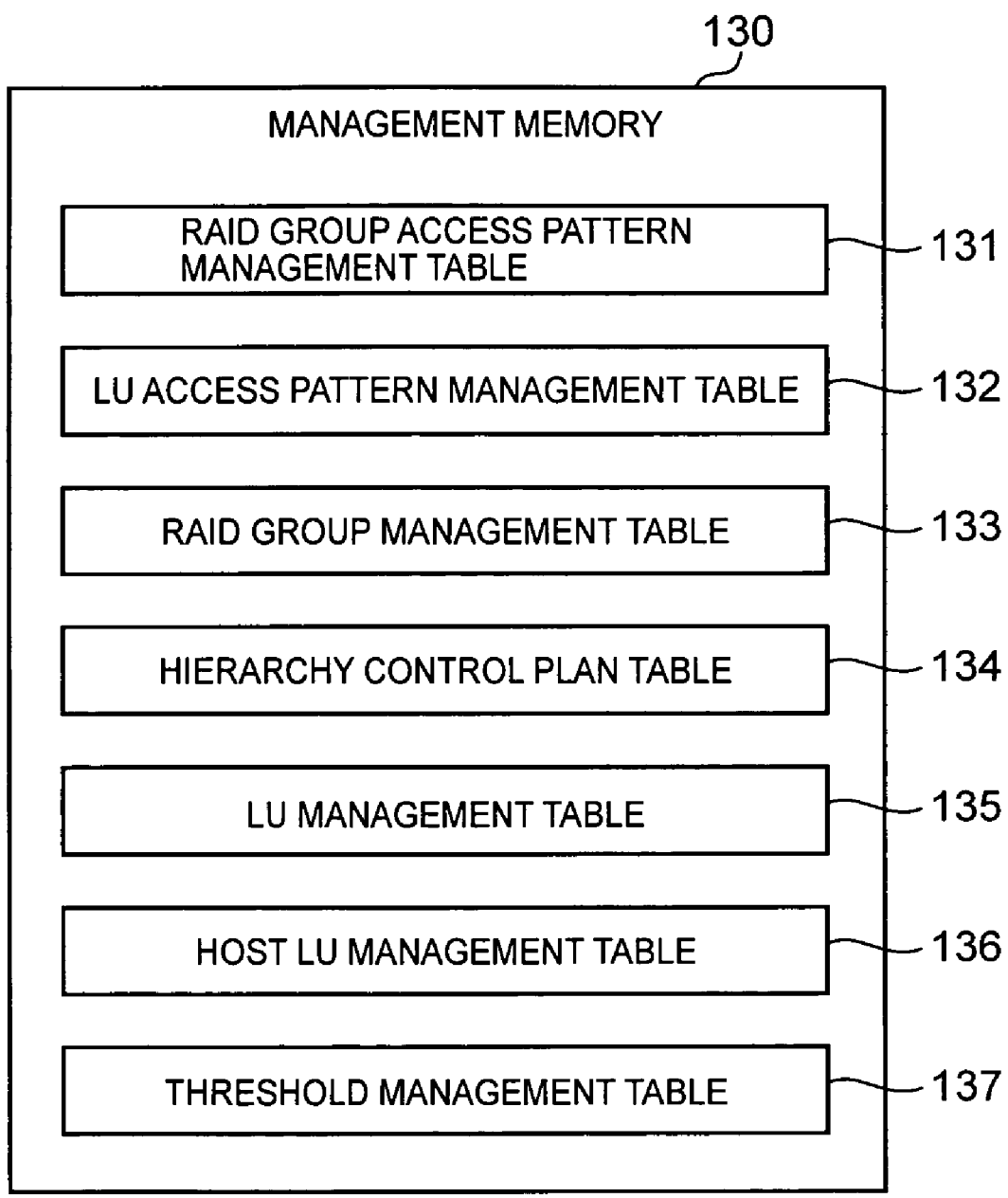
FIG. 3 is an explanatory diagram showing contents stored in a management memory.

FIG. 3 is an explanatory diagram showing the management information stored in the management memory 130, the management information being related to power control and relocation of volumes. The management memory 130 has stored therein, for example, a RAID group access pattern management table 131, a LU access pattern management table 132, a RAID group management table 133, a hierarchy control plan table 134, a LU management table 135, a host LU management table 136, and a threshold management table 137.

Configurations of the tables 131 through 136 are described hereinafter. To simply describe them, the RAID group access pattern management table 131 is a table for managing an access pattern related to each RAID group 220. The LU access pattern management table 132 is a table for managing an access pattern related to each logical volume 230.

The RAID group management table 133 is a table for keeping information related to each RAID group 220. The hierarchy control plan table 134 is a table created by a hierarchy control plan creation processing 166, which is described hereinafter. The LU management table 135 is a table which keeps the information related to each logical volume 230. The host LU management table 136 is a table is a table which manages the logical volume 230 provided to each host 20 by the storage controller 10. The threshold management table 137 is a table which manages a plurality of types of thresholds used in the processing described hereinafter.

Figure 4:
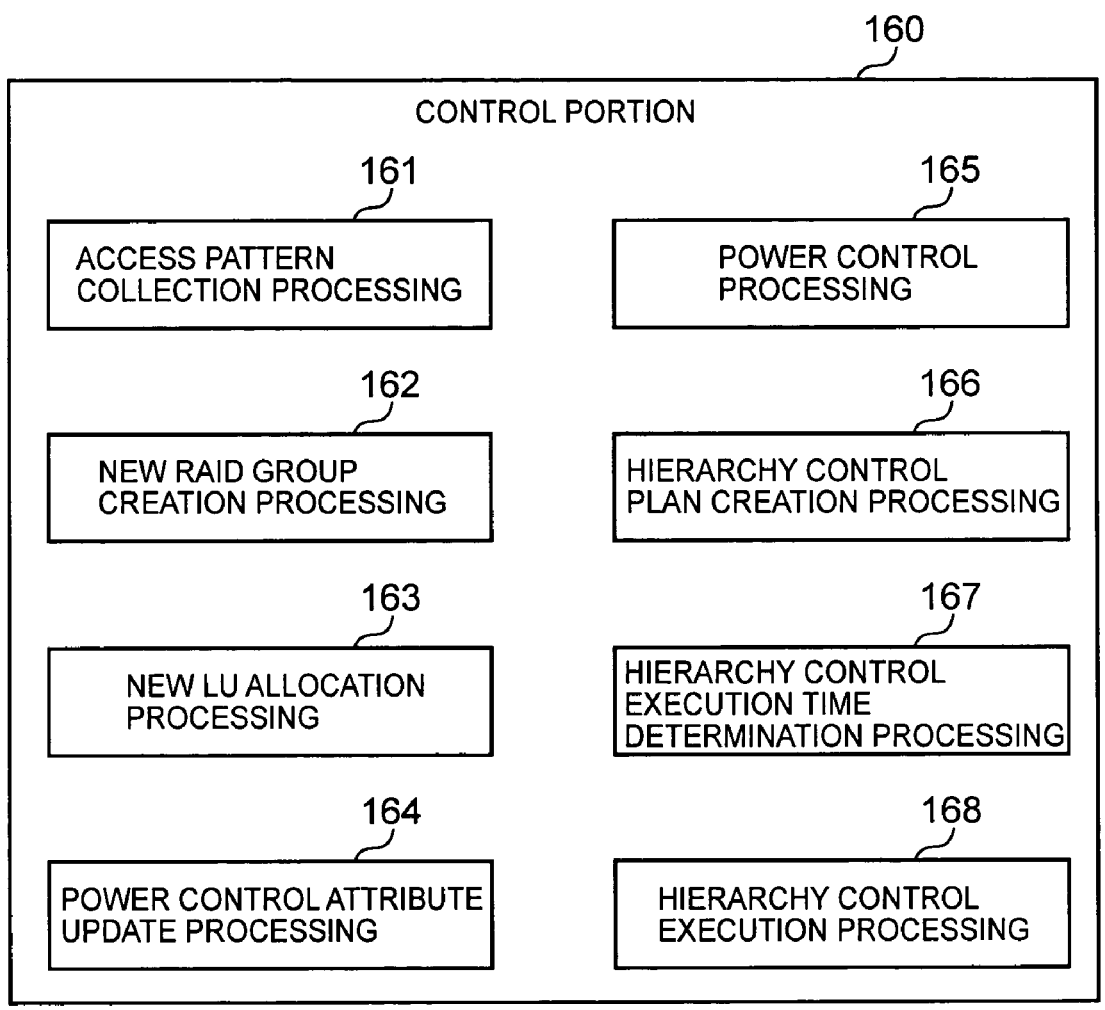
FIG. 4 is an explanatory diagram showing the processing which is executed by a control portion.

FIG. 4 schematically shows each processing executed by the control portion 160. The control portion 160 can execute, for example, an access pattern collection processing 161, a new RAID group creation processing 162, a new LU allocation processing 163, a power control attribute update processing 164, a power control processing 165, a hierarchy control plan creation processing 166, a hierarchy control execution time determination processing 167, and hierarchy control execution processing 168. Each of the processings 161 through 168 is described in detail hereinafter, but a summary of the each is simply described next.

The access pattern collection processing 161 corresponds to the "access information collection portion," and collects access patterns (access status) related to each RAID group 220 and each logical volume 230LU.

The new RAID group creation processing 162 creates a new RAID group 220 inside the storage controller 10. The processing 162 can also be referred to as, for example, "new physical storage device creation portion." The new LU allocation processing 163 set a new logical volume 230 inside the RAID group 220 to make the newly generated logical volume 230 available from the host 20. The processing 163 can be referred to as, for example, "new logical storage device creation portion."

The power control attribute update processing 164 updates a power control attribute which is set in each RAID group 220, on the basis of an access pattern related to each RAID group 220. The processing 164 corresponds to the "power supply mode setting portion." The power control processing 165 controls operation of the hard disk power portion 240 via the power control portion 150. The power control processing 165 can switch the power of each of the disk drives 210 ON and OFF individually.

The hierarchy control plan creation processing 166 creates a hierarchy control plan (also referred to as "data relocation plan," "volume relocation plan," or "volume movement plan,") which is executed by the hierarchy control execution processing 168. The processing 166 corresponds to the "relocation plan creation portion." The hierarchy control plan which is created by the processing 166 is registered in the hierarchy control plan table 134.

The hierarchy control execution time determination processing 167 corresponds to the "execution time determination portion." The processing 167 determines an execution time by judging the low load time zone so that hierarchy control processing does not affect the performance of the storage controller 10. A determined execution time is registered in the hierarchy control plan table 134. The hierarchy control execution processing 168 executes the hierarchy control plan, which is created by the hierarchy control plan creation processing 166, at the time determined by the execution time determination processing 167. The processing 168 corresponds to the "relocation execution portion."

Figure 5:
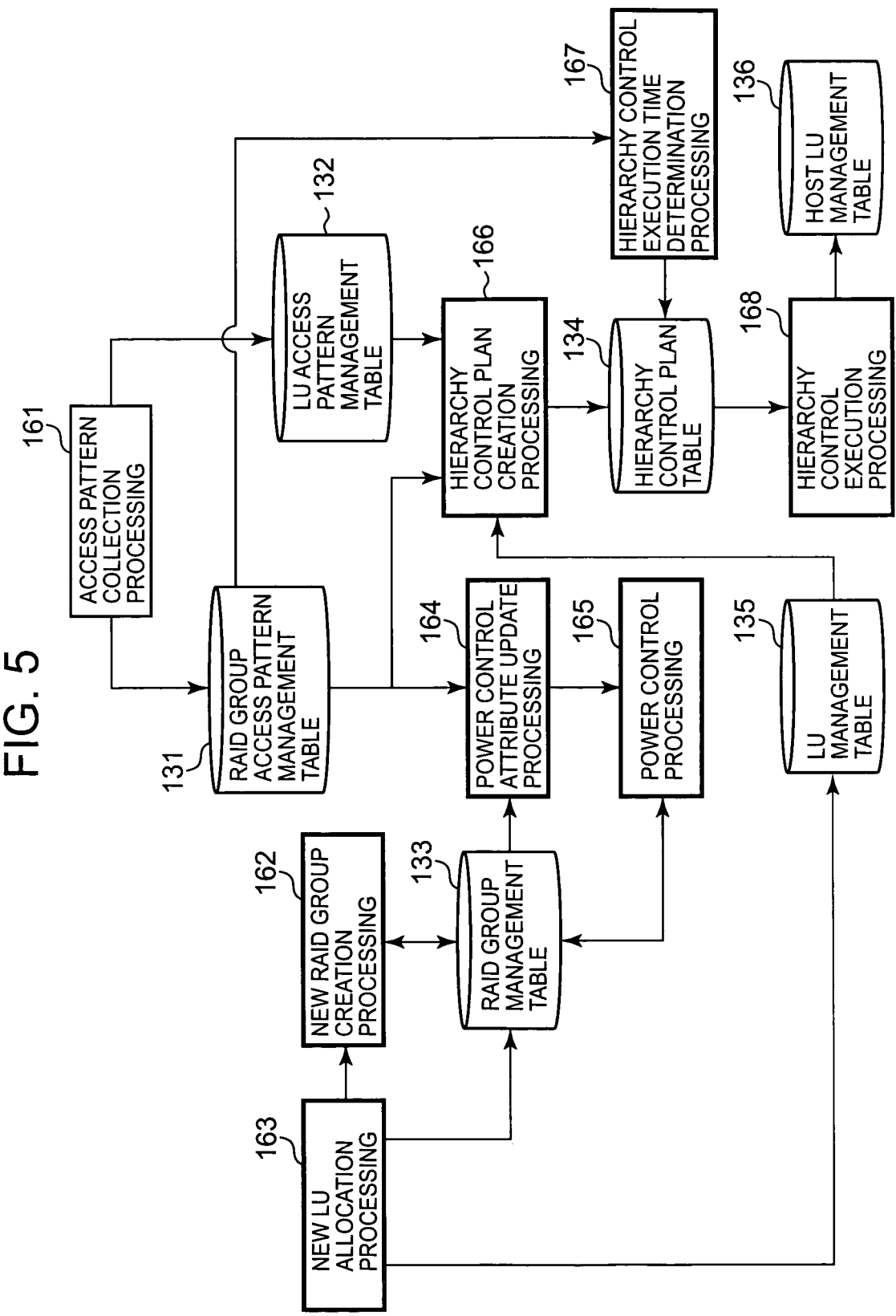
FIG. 5 is an explanatory diagram showing the relationship between the contents stored in the management memory and each processing performed in the control portion.

FIG. 5 is an explanatory diagram schematically showing the relationship between each table and each processing. The access pattern collection processing 161 detects an access pattern for accessing each RAID group 220, and records it in the RAID group access pattern management table 131. The access pattern collection processing 161 detects an access pattern for accessing each logical volume 230, and records it in the LU access pattern management table 132.

The power control attribute update processing 164 calculates access frequency from the access pattern for accessing each RAID group 220, and sets a power control attribute corresponding to the access frequency in each RAID group 220. A power control attribute of "constant energization" is set in the frequently used RAID groups 220 so as to supply power constantly. A power control attribute of either "ON-OFF control (normal)" or "ON-OFF control (long-time OFF)" is set in the infrequently used RAID groups 220 so as to supply power when necessary. The power control attributes of the respective RAID groups 220 are stored in the RAID group management table 133. The power control processing 165 performs ON-OFF control on the power of the disk drive 210 for each RAID group on the basis of the power control attribute.

When a new RAID group 220 is created by the new RAID group creation processing 162, information about the new RAID group 220 is registered in the RAID group management table 133. When a new logical volume 230 is created by the new LU allocation processing 163, information about the new logical volume 230 is registered in the LU management table 135, and the RAID group management table 133 is updated.

The hierarchy control plan creation processing 166 refers to the RAID group access pattern management table 131 and the LU access pattern management table 132, thereby acquiring the access patterns for each RAID group 220 and each logical volume 230 respectively. The hierarchy control plan creation processing 166 then judges which logical volume 230 is preferred for disposition in which RAID group 220, on the basis of the aspects of the power control, and creates a movement plan (hierarchy control plan) of the logical volume 230. Specifically, the hierarchy control plan creation processing 166 creates a plan for changing a rank to which the logical volume 230 belongs. The created hierarchy control plan is stored in the hierarchy control plan table 134.

The hierarchy control execution time determination processing 167 determines a preferred time for executing a hierarchy control plan on the basis of an access pattern of a source RAID group 220 and of a destination RAID group 220. A determined time is registered in the hierarchy control plan table 134.

The hierarchy control execution processing 168 executes the hierarchy control plan when the determined time comes, and disposes the logical volume 230 in a more appropriate rank. A result of the execution of the hierarchy control is reflected in the host LU management table 136.

Examples of configurations of the abovementioned tables are described next. FIG. 6 is an explanatory diagram showing an example of the RAID group access pattern management table 131. The RAID group access pattern management table 131 can have, for example, a time zone and access information for each RAID group 220.

The time zone means a time-wise sectioning in which the access information is collected. The form of the time zone is not considered as long as the time zone has information that can uniquely represent any type of time zone. For example, a start date and time and end date and time when the access information items are collected may be recorded, or a start time and offset value may be recorded. The access information can be collected every predetermined time period, e.g. every 10 minutes. A time zone in which the access information is collected, that is a time interval for collecting the access information can be set arbitrarily. The collection time interval can be set from, for example, the maintenance terminal 30 or the management center 40.

The access information is information that indicates whether an access request (write request or read request) is present in the RAID group 220 from the host 20. A value of either "there is access" or "there is no access" is set in the access information. The initial value is "there is no access." The access information is updated by the access pattern collection processing 161. Not only the case in which the presence of the access request is recorded, but also a configuration in which the number of accesses in each time zone is recorded is possible. When using the number of accesses as the access information, the initial value of the number of accesses is set to zero.

FIG. 7 shows an example of the LU access pattern management table 132. The LU access pattern management table can have, for example, a time zone and access information for each logical volume 230. In the LU access pattern management table 132, information for discriminating the logical volumes 230 (LU number) is used instead of the information for discriminating the RAID groups 220 (RAID group number). Other facts of the LU access pattern management table are the same as those of the RAID group access pattern management table 131. Specifically, whether or not the access request for accessing each logical volume 230 is detected in the collection time interval (time zone), which can be set arbitrarily from the maintenance terminal 30 or management center 40, is recorded in the LU access pattern management table 132. It should be noted that a common value of the time zone may be set or different values may be set in the RAID group access pattern management table 131 and the LU access pattern management table 132.

FIG. 8 shows an example of the RAID group management table 133. The RAID group management table 133 can have, for example, a RAID group number for discriminating the RAID groups 220, a free space, total size, power control attribute, power status, corresponding logical volume number, and corresponding disk drive number.

The RAID group number is a number of an effective RAID group 220. The free space is a size of an available storage region in this RAID group 220. A new logical volume 230 with the amount of the free space can be created in the RAID group 220. The total size is the size of the total storage region in the RAID group 220. The total value of the capacity of the logical volume 230 which can be stored in the RAID group 220 is a value equal to or smaller than the total size of the RAID group 220.

The power control attribute is information indicating a method of controlling the power of the disk drives 210 configuring the RAID group 220. For the power control attribute, any value of "constant energization," "ON-OFF control (normal)," or "ON-OFF control (long-time OFF)" is set. "Constant energization" corresponds to the "long-time energization mode" in which power is constantly supplied to each of the disk drives 210 configuring the RAID group 220 which is set to "constant energization."

"ON-OFF control (normal)" corresponds to the "short-time energization mode" or "first short-time energization mode." The "ON-OFF control (long-time OFF)" corresponds to the "short-time energization mode" or "second short-time energization mode." Only when necessary, power is supplied to each of the disk drives 210 configuring the RAID group 220 which is set to either "ON-OFF control (normal)" or "ON-OFF control (long-time OFF)." "Only when necessary" means when an access request sent form the host 20 is detected. When a predetermined amount of time has elapsed since access requests have been no longer sent, power supply to each of the disk drives 210 is stopped.

The power status means that a power status of the disk drive 210 configuring the RAID group 220 is set. For the power status, a value of either "ON" or "OFF" is set. The disk drive 210 configuring the RAID group 220 in which the value of the power status is "ON" is supplied with power from the hard disk power 240. The disk drive 210 configuring the RAID group 220 in which the value of the power status is "OFF" is not supplied with power from the hard disk power 240.

In the corresponding LU number, a list of volume numbers of the logical volumes 230 which are set in the RAID group 220 is stored. In the corresponding drive number, a list of drive numbers of the disk drives 210 configuring the RAID group 220 is stored.

FIG. 9 shows an example of the hierarchy control plan table 134. The hierarchy control plan table 134 can have, for example, a movement number for discriminating movements of the logical volumes 230, a volume number of a source logical volume, a volume number of a destination logical volume, and a transfer time (execution time). Each value in the hierarchy control plan table 134 is set by the hierarchy control plan creation processing 166 and the hierarchy control execution time determination processing 167. The volume number of the source logical volume and the volume number of the destination logical volume are set by the hierarchy control plan creation processing 166, and the transfer time is set by the hierarchy control execution time determination processing 167. The hierarchy control execution processing 168 is carried out on the basis of the hierarchy control plan table 134 which is created as above.

FIG. 10 shows an example of the LU management table 135. The LU management table 135 can have, for example, a volume number (LU #) of each logical volume 230, a number of a corresponding RAID group 220, a volume size, coupled volume number; and constant energization flag. The volume number is a number of an effective logical volume 230 inside the storage controller 10. The corresponding RAID group number is a number for identifying a RAID group 220 in which this logical volume 230 is disposed. The volume size indicates the total capacity in the storage region that this logical volume 230 has.

The coupled volume number is set when a plurality of logical volumes 230 are coupled to one another to be provided as a single logical volume to the host. This function provided by the control portion 160 is called "LU coupling function." The list of volume numbers of the coupled logical volumes 230 is set in the coupled volume number. In the example shown in the figure, by coupling three logical volumes (LU #2, 3, 5), each of which has a capacity of 100 GB, a single logical volume having a total capacity of 300 GB (LU #2) is configured.

On the other hand, the control portion 160 has a function called "LU divide function." This function divides a single logical volume 230 into a plurality of logical volumes 230. The logical volumes 230 with a flexible capacity can be provided to the host 20 by means of the LU divide function and the LU coupling function.

The constant energization flag is a flag for specifying whether to fix the logical volumes 230 to the RAID group 220 in which the power control attribute is set to "constant energization." The constant energization flag can be set by, for example, manual operation by the user. Any of the values "ON," "OFF," or "invalid value" is set as the constant energization flag. The logical volume 230 in which the constant energization flag is set to "ON" is fixed inside the RAID group 220 which is in "constant energization" state. The logical volume 230 in which the constant energization flag is set to "OFF" can be disposed in the RAID group 220 which is set to "constant energization," "ON-OFF control (normal)," or "ON-OFF control (long-time OFF)" in accordance with the hierarchy control plan (volume relocation plan). When "invalid value" is set in the constant energization flag, the value is skipped.

FIG. 11 shows an example of the host LU management table 136. The host LU management table 136 can comprise a host LU number, corresponding volume number, and corresponding host number. The host LU number is a number of logical volumes which is recognized by the host 20. The host LU number is a number used by the host 20 to uniquely identify the logical volume 230 provided by the storage controller 10. The corresponding volume number is a number for identifying the logical volume 230 corresponding to the host LU number. Specifically, the host LU number is a volume number provided for the host 20, and the corresponding volume number is a volume number which is managed in the storage controller 10. The corresponding host number is information for uniquely discriminating the host 20 which accesses the logical volume 230. It should be noted that when the logical volume 230 is accessed from each of a plurality of host 20, a list of number of the plurality of hosts is set.

FIG. 12 shows an example of the threshold management table 137. The threshold management table 137 can have, for example, a constant energization threshold TH1 and a long-time OFF threshold TH2. The constant energization threshold TH1 and the long-time OFF threshold TH2 are used in the hierarchy control plan creation processing 166 and the power control attribute update processing 164. Each of the thresholds TH1 and TH2 is set to be 0% to 100%, but a larger value is set for the constant energization threshold TH1 than the long-time OFF threshold TH2.

The constant energization threshold TH1 is used to determine whether to move the logical volumes 230 to the RAID group 220 which is in the "constant energization" state. The TH1 is set as, for example, "80% access frequency." The long-time OFF threshold TH2 is used to determine whether to move the logical volumes 230 to the RAID group 220 which is in the "ON-OFF control (long-time OFF)" state. The TH2 is set as, for example, "2% access frequency." The logical volumes 230 having the access frequency between TH1 and TH2 are disposed in the RAID group 220 which is in the "ON-OFF control (normal)" state. It should be noted that the above numeric values are merely examples, thus the present invention is not limited to these values.

The operation of the storage controller 10 is described next. In the following description, the term "step" is abbreviated as "S." Further, each of the flow charts shows an overview of the operation within a scope required for understanding the present invention, and is different from an actual program.

Figure 13:
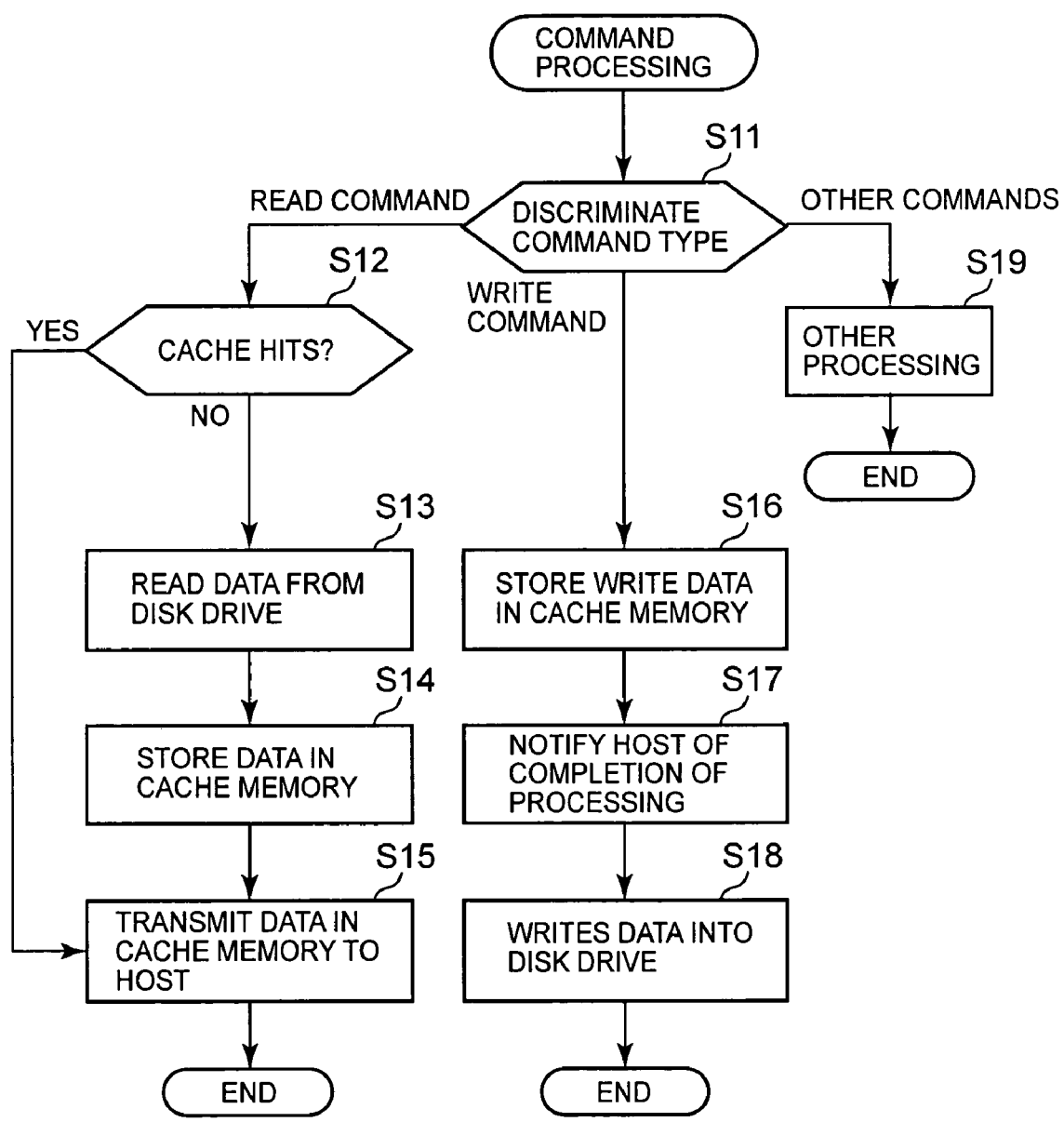
FIG. 13 is a flow chart showing a command processing.

FIG. 13 is a flow chart showing a command processing for processing the access requests sent from the host 20. The control portion 160 can process, individually, each access request sent from the host 20.

When the channel I/F 110 receives an access request from the host 20, the control portion 160 discriminates the command type (S11). The command type is roughly classified into, for example, a read command, write command, and other commands.

When a read command is received from the host 20, the control portion 160 judges whether data (read data), which is requested to be read from the host 20, is stored in the cache memory 140 (S12). If the requested data is stored in the cache memory 140 (S12: YES), the control portion 160 reads the data stored in the cache memory 140 and transmits it to the host 20 (S15).

On the other hand, if the data requested from the host 20 is not stored in the cache memory 140 (S12: NO), the control portion 160 allows a predetermined disk drive 210 to read the requested data via the disk I/F 120 (S13). The data which is read from the disk drive 210 is stored in the cache memory 140 (S14), and then transmitted to the host 20 (S15).

It should be noted here that the predetermined disk drive 210 means a disk drive 210 which stores or should store data related to an access request. Which disk drive 210 to access can be judged on the basis of the logical addresses contained in a read command and write command sent from the host 20.

When a write command is received from the host 20, the control portion 160 causes the cache memory 140 to store the write data received from the host 20 (S16). Before writing the write data into a predetermined disk drive 210, the control portion 160 notifies the host 20 of that the write command has been processed (S17). The control portion 160 then judges timing, and writes the write data stored in the cache memory 140 into the predetermined disk drive 210 (S18). The time taken for processing the write command can be reduced by making the time for notifying a completion of processing of the write command different from the time for writing the write data. It should be noted that a configuration is possible in which the host 20 can be notified of the completion of processing of the write command after the write data is written into the disk drive 210.

When other command is received from the host 20, the control portion 160 executes the processing corresponding to the command (S19). Examples of the command can include a query command and the like for inquiring about a state of the logical volume 230 (volume size, free space, and the like).

Figure 14:
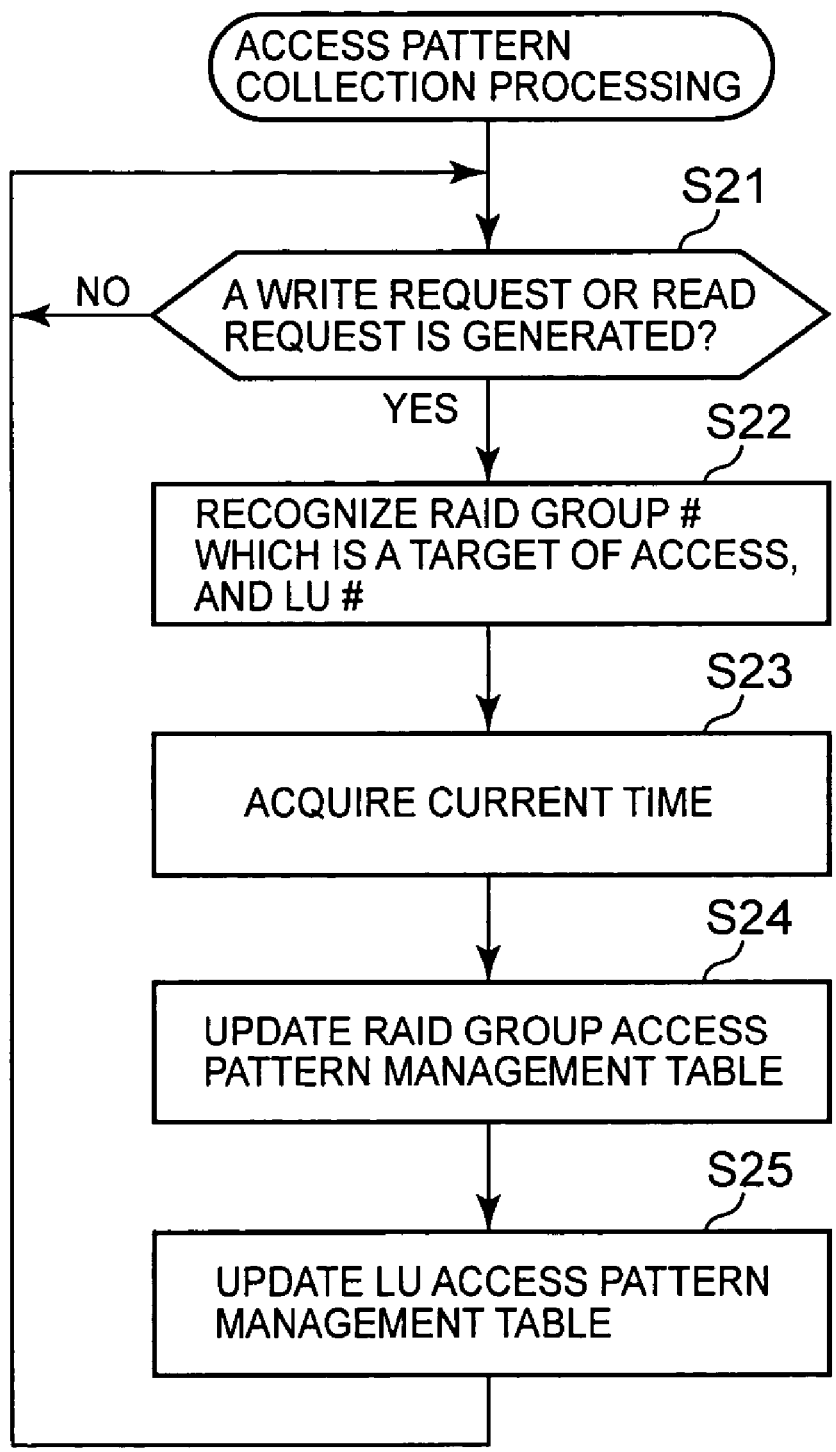
FIG. 14 is a flow chart showing an access pattern collection processing.

FIG. 14 is a flow chart showing an operation of the access pattern collection processing 161. This processing is started with the access request from the host 20 as a starting factor (S21). When the access request is detected (S21: YES), the control portion 160 analyzes a command received from the host 20, thereby identifying a RAID group number and volume number that are the target of access (S22).

The control portion 160 then acquires a present time on the basis of a built-in timer, counter, or the like (S23), and updates the RAID group access pattern management table 131 and the LU access pattern management table 132 (S24, S25). The control portion 160 sets the access information in the accessed time zone to "there is access" for the accessed group RAID group 220. Similarly, the control portion 160 sets the access information in the access time zone to "there is access" for the accessed logical volume 230. For the access information, when the number of accesses in each time zone is recorded, instead of recording the presence of an access in each time zone, the number of accesses may be increased by one.

Figure 15:
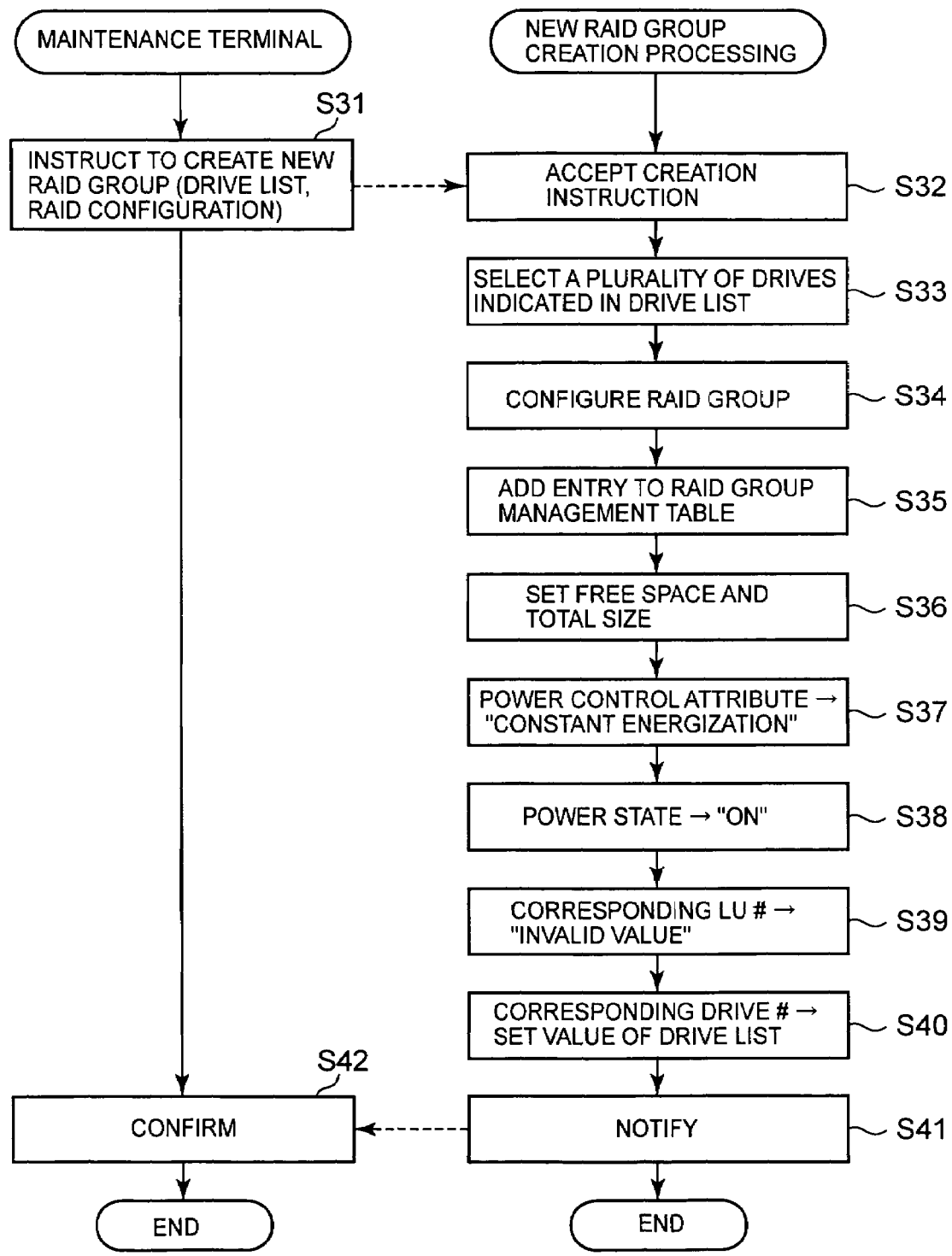
FIG. 15 is a flow chart showing a new RAID group creation processing.

FIG. 15 is a flow chart showing an operation of the new RAID group creation processing 162. The user can create a new RAID group 220 in the storage controller 10 by means of this processing 162.

The user instructs the control portion 160, via, for example, the maintenance terminal 30, to create a new RAID group (S31). This instruction includes information such as the list of drive numbers of the disk drives 210 configuring the new RAID group, a RAID configuration, and the like.

When the control portion 160 receives the instruction for creating a new RAID group from the maintenance terminal 30 (S32), the control portion 160 selects a plurality of disk drives 210 indicated in the drive list (S33). The control portion 160 uses these selected disk drives 210 to create a RAID group 220 which has the RAID configuration specified by the above mentioned instruction (S34). The control portion 160 then creates a new entry in the RAID group management table 133 in order to additionally register a group number and the like of the newly created RAID group 220 (S35).

The control portion 160 then sets the same size for the free space and the total size of the newly created RAID group 220 in the RAID group management table 133 (S36). The same size means a total value of the storage region of each of the disk drives 210 configuring the RAID group 220. The storage region in the redundant disk is eliminated.

The control portion 160 sets "constant energization" as the power control attribute of the newly created RAID group 220 (S37), and sets "ON" as the power state (S38). The control portion 160 further sets an invalid value as the corresponding volume number, the invalid value indicating that the volume number is unset (S39), and, for the corresponding drive number, sets a number indicated in the drive list in the instruction received in S32 (S40). In the initial state, the power of each disk drive 210 configuring the newly created RAID group 220 is switched OFF, but the power of the each disk drive 210 is switched ON at the time when the newly created RAID group 220 is registered in the RAID group management table 133.

Figure 16:
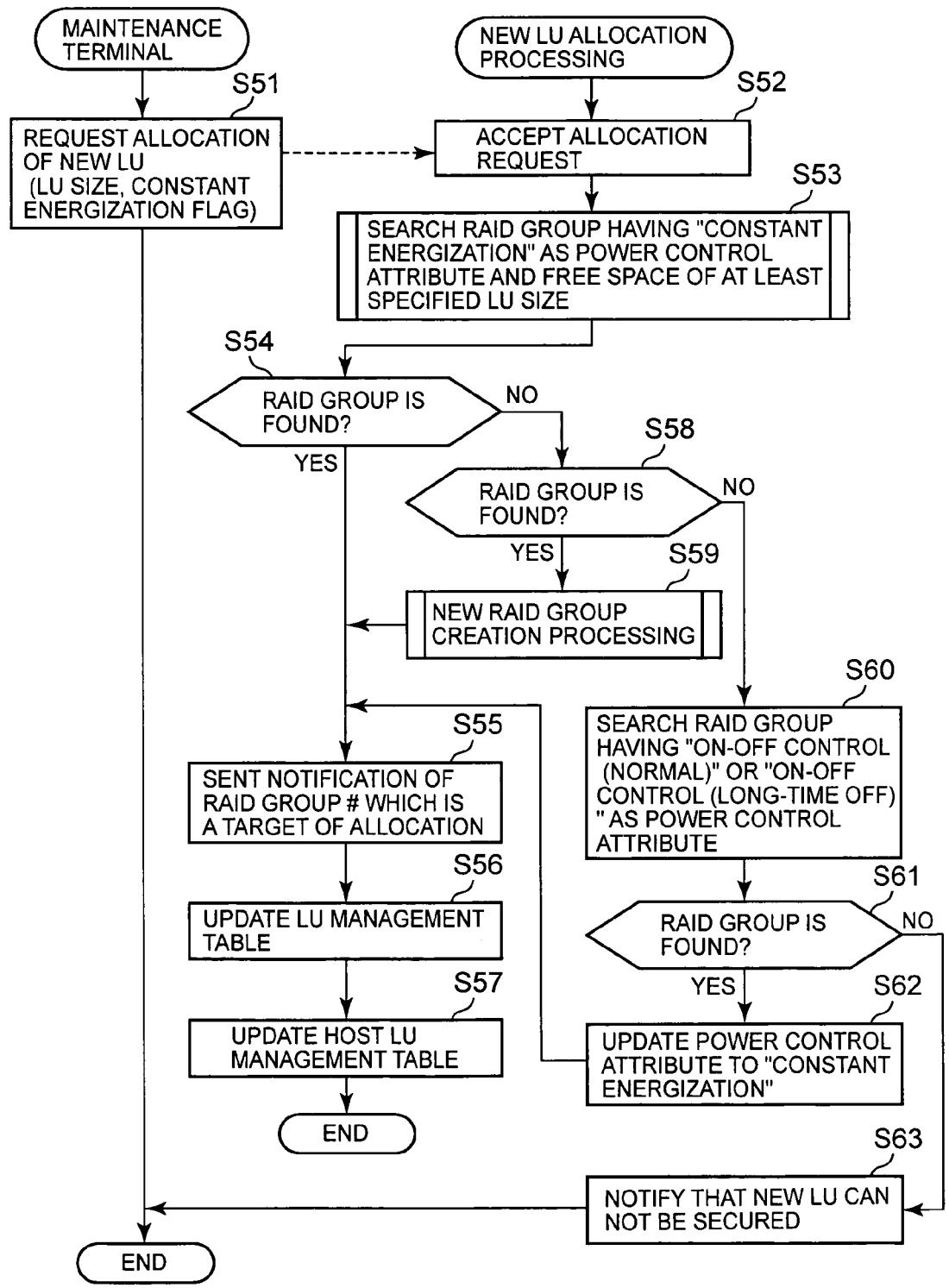
FIG. 16 is a flow chart showing a new LU allocation processing.

FIG. 16 is a flow chart showing an operation of the new LU allocation processing 163. With this processing 163, the logical volume 230 provided in the RAID group 220 is brought to a state in which the logical volume 230 can be allocated in the host 20.

The user requests the control portion 160, via the maintenance terminal 30, for allocation of a new logical volume 230 (S51). The allocation means that the logical volume 230 is set in the RAID group 220. This allocation request has the size of a newly created logical volume 230 and value of a constant energization flag. As the constant energization flag, any of the values of "ON", "OFF", or "invalid value" is set.

Figure 17:
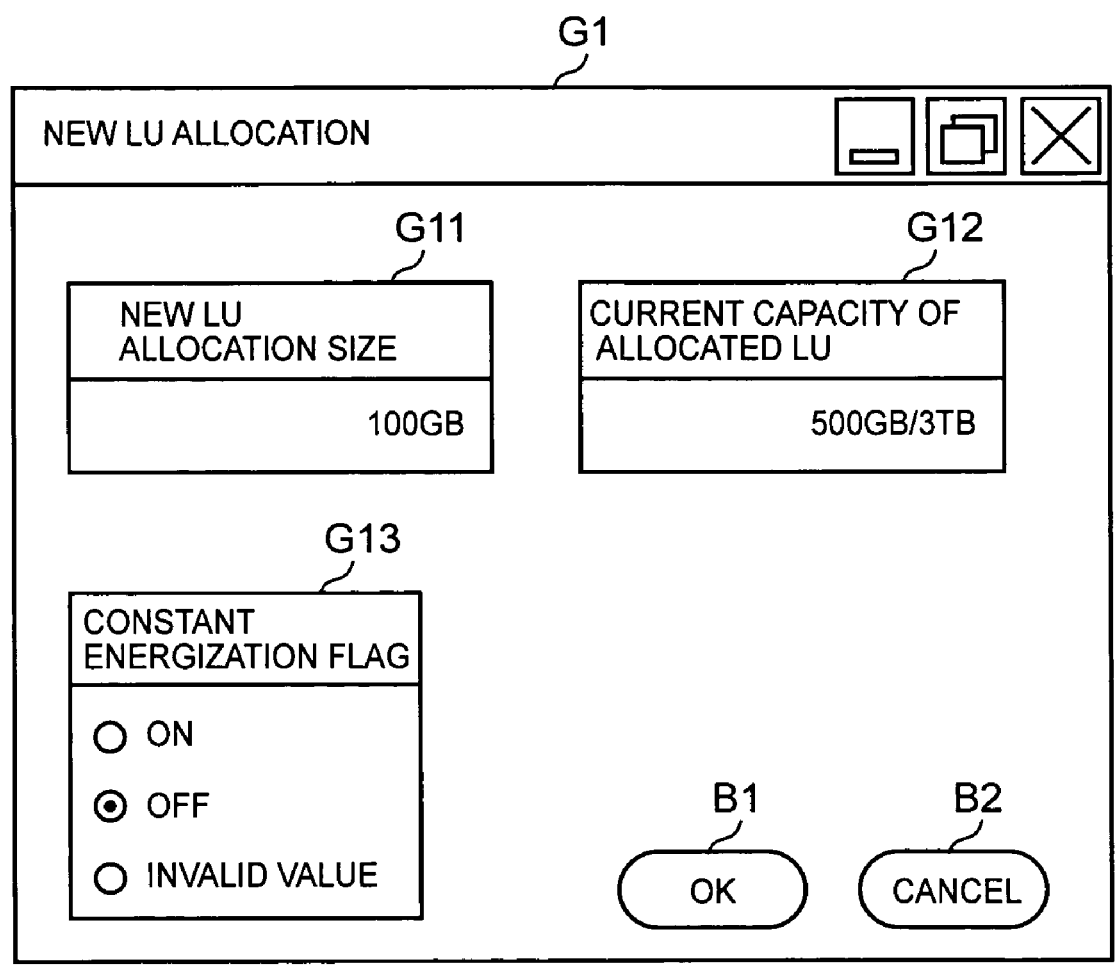
FIG. 17 is an explanatory diagram showing an example of a screen of a terminal which is displayed in S51 in FIG. 16.

Here, FIG. 17 is referred. FIG. 17 shows an example of a new LU allocation screen G1 which is displayed on a screen of the maintenance terminal 30 in S51 in FIG. 16. The screen G1 can comprise, for example, a new LU allocation size input portion G11, a present LU-allocated capacity display portion G12, a constant energization flag setting portion G13, and a few buttons such as B1 and B2.

The new LU allocation size input portion G11 is used by the user to freely specify the size of the logical volume 230 to newly allocate. FIG. 17 shows, as an example, a case in which a new LU having a size of "100 GB" is allocated. The present LU-allocated capacity display portion G12 displays the total capacity of the allocated LU, of the total capacity that the disk array device 200 has. FIG. 17 shows that, as an example, an LU having a size of 500 GB of the total of 3 TB storage capacity is already allocated.

The constant energization flag setting portion G13 is used by the user to set the constant energization flag with respect to the logical volume 230 which is newly allocated. FIG. 17 shows a case in which "OFF" is set as the constant energization flag. The OK button B1 is a button for accepting a value which is set on the screen G1. The cancel button B2 is a button for canceling an operation of allocating a new LU. Both buttons B1 and B2 are operated by the user. When the user operates the OK button B1, the step is shifted from S51 to S52 in FIG. 16.

Returning to FIG. 16, when the control portion 160 receives an allocation request from the maintenance terminal 30 (S52), of the RAID groups 220 registered in the RAID group management table 133, RAID groups 220 in which the power control attributes are set to "constant energization", and which have a free space having at least the size specified by the allocation instruction are searched (S53). Here, the abovementioned LU divide function or the LU coupling function may be used to allocate the new volume.

The reason for searching the RAID group 220 in which the power control attribute is set to "constant energization" is to continuously examine the initial access pattern related to a newly allocated logical volume 230 by means of the access pattern collection processing 161.

Figure 18:
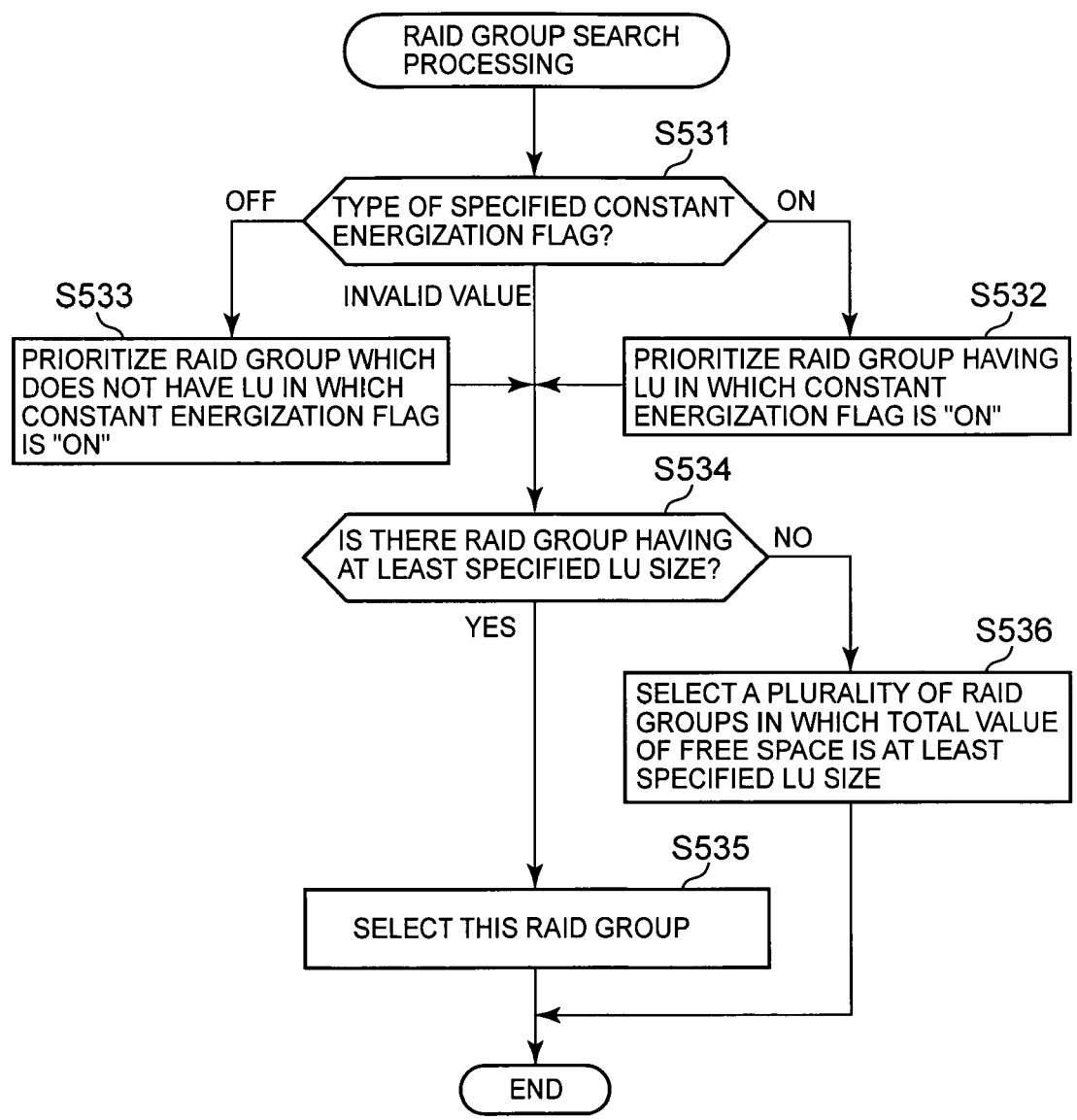
FIG. 18 is a flow chart showing the detail of S53 in FIG. 16.

The processing of searching a RAID group (S53) is executed in accordance with the value of the constant energization flag specified by the user. In this case, FIG. 18 is referred first, and the processing of searching the RAID group is explained.

The control portion 160 judges whether the value of the constant energization specified by the user is "ON," "OFF," or "invalid value" (S531). If "ON" is specified as the constant energization flag, the control portion 160 searches a RAID group 220, as a priority, which contains a logical volume 230 in which the constant energization flag is set to "ON" (S532). Specifically, a search scope for the RAID group 220 is set such that, when creating a new logical volume 230 in which "ON" is specified as the constant energization flag is specified, this new logical volume 230 is disposed in the same RAID group 220 in which the constant energization flag of a created logical volume 230 is set to "ON."

When "OFF" is specified as the constant energization flag, the control portion 160 searches a RAID group 220, as a priority, which does not contain a logical volume 230 in which the constant energization flag is set to "ON" (S533). When "invalid value" is specified as the constant energization flag, the priority on the search is not considered.

As described above, on the basis of the value of the energization flag which is previously specified for a newly created logical volume, a priority is set in the search scope for searching a RAID group 220 as a location for depositing the newly created volume. Accordingly, it is possible to reduce the chance that the logical volume 230 in which "OFF" is specified as the constant energization flag, and the logical volume 230 in which "ON" is specified as the constant energization flag are disposed at the same time in the same RAID group 220.

The control portion 160 judges whether a RAID group 220 having a free space of at least a specified volume size is detected or not (S534). If a RAID group 220 having a free space of at least the specified volume size is detected (S534: YES), the control portion 160 selects this RAID group 220 as a location for allocating a new logical volume (S535). If a single RAID group 220 having a free space of at least the specified volume size is not detected (S534: NO), the control portion 160 selects a plurality of RAID groups 220 and secures a free space of at least the specified volume size (S536).

Returning to FIG. 16, the control portion 160 judges whether a RAID group 220 in which the power control attribute is set to "constant energization" and which has a free space of at least the specified volume (referred to as "predetermined RAID group 220" in the description of this processing hereinafter) is detected (S54).

When a predetermined RAID group 220 is detected (S54: YES), the control portion 160 notifies the maintenance terminal 30 of that the predetermined RAID group 220 is detected and the group number of the predetermined RAID group 220 (S55).

It should be noted in S55 that the terminal screen of the maintenance terminal 30 may be allowed to display a screen for requesting a confirmation of the user. This confirmation screen can display the group number of the detected RAID group 220 and a message saying, for example, "Is it OK to create a new LU number in RAID group with a group number ** (YES/NO)?" or the like. The user can accept it by operating the OK button B1. The user also can cancel by operating the cancel button B2.

The control portion 160 then updates the LU management table 135 (S56). Specifically, the number of the RAID group 220 which is detected in S54 is set as a corresponding number of the RAID group, the size which is accepted in S52 is set as the volume size, and the value which is accepted in S52 is set as the constant energization flag. Further, when newly allocated logical volumes 230 are configured using the LU coupling function, a list of the coupled logical volumes 230 is set as the coupled LU number, and if not, an invalid value is set.

Next, the control portion 160 allocates a new logical volume 230 and updates the contents of the host LU management table 136 (S57). Specifically, the number of the newly allocated logical volume 230 is set as a corresponding LU number of the host LU management table 136, and the discrimination information of the host 20 that uses the newly allocated logical volume 230 is set as a corresponding host number. By registering information related to the new logical volume 230 in the host LU management table 136, the new logical volume 230 is brought to a state where the new logical volume 230 can be accessed from the host 20.

It should be noted in S57 that the maintenance terminal 30 can be notified positively or passively of that the allocation of the new LU has completed. Notifying positively means that information indicating completion of allocation of the new LU is transmitted from, for example, the control portion 160 to the maintenance terminal 30. Notifying passively means that, for example, the maintenance terminal 30 refers to the host LU management table 136 periodically, and thereby confirming the completion of allocation of the new LU.

On the other hand, when the RAID group 220 which satisfies the above conditions is not detected (S54: NO), the control portion 160 judges whether a new RAID group 220 can be created or not (S58). Specifically, the control portion 160 judges whether if the storage controller 10 has a disk drive 210 having a free space large enough to create a new RAID group 220.

If it is judged that a new RAID group 220 can be created (S58: YES), the control portion 160 executes the new RAID group creation processing 162 (S59) to create a new RAID group 220, and secures a region for allocating a new logical volume 230. The control portion 160 then executes the steps S55 through S57 and ends this processing.

If it judged that a new RAID group 220 cannot be created (S58: NO), the control portion 160 searches, a RAID group 220 having a free space of at least the volume size which is accepted in S52, from among the RAID groups 220 in which any of the power control attributes thereof is set to "ON-OFF control (normal)" or "ON-OFF control (long-time OFF)" (S60).

When a RAID group 220 satisfying the search condition of S60 is found (S61: YES), the control portion 160 changes the power control attribute of the RAID group 220 to "constant energization" (S62), and updates the RAID group management table 133. The control portion 160 then notifies the maintenance terminal 30 of the number of the RAID group 220 with the changed power control attribute and of that the power control attribute of this RAID group 220 has been changed (S55). Thereafter, the control portion 160 executes the steps of S56 and S57 and ends this processing.

If a RAID group 220 satisfying the search condition of S60 is not found (S61: NO), a new logical volume 230 cannot be created. Therefore, the control portion 160 notifies the maintenance terminal 30 of an error (S63). This error notification has information indicating, for example, that a new logical volume 230 cannot be allocated, and this information is displayed on the terminal screen of the maintenance terminal 30. After checking this error notification, the user can consider, for example, upgrading the disk drive 210.

It should be noted that the instruction for the processing of allocating a new LU can be sent not only from the maintenance terminal 30, but also from the management center 40. Furthermore, a storage management program can be installed in the host 20, and the instruction for the processing of allocating a new LU can be provided to the control portion 160 from the storage management program via the communication network CN11. Specifically, either a method of providing the instruction from the maintenance terminal 30 or the management center 40 via the network CN12 (outbound method), or a method of providing the instruction from the host 20 via the network CN11 for data (inbound method) can be employed.

Figure 19:
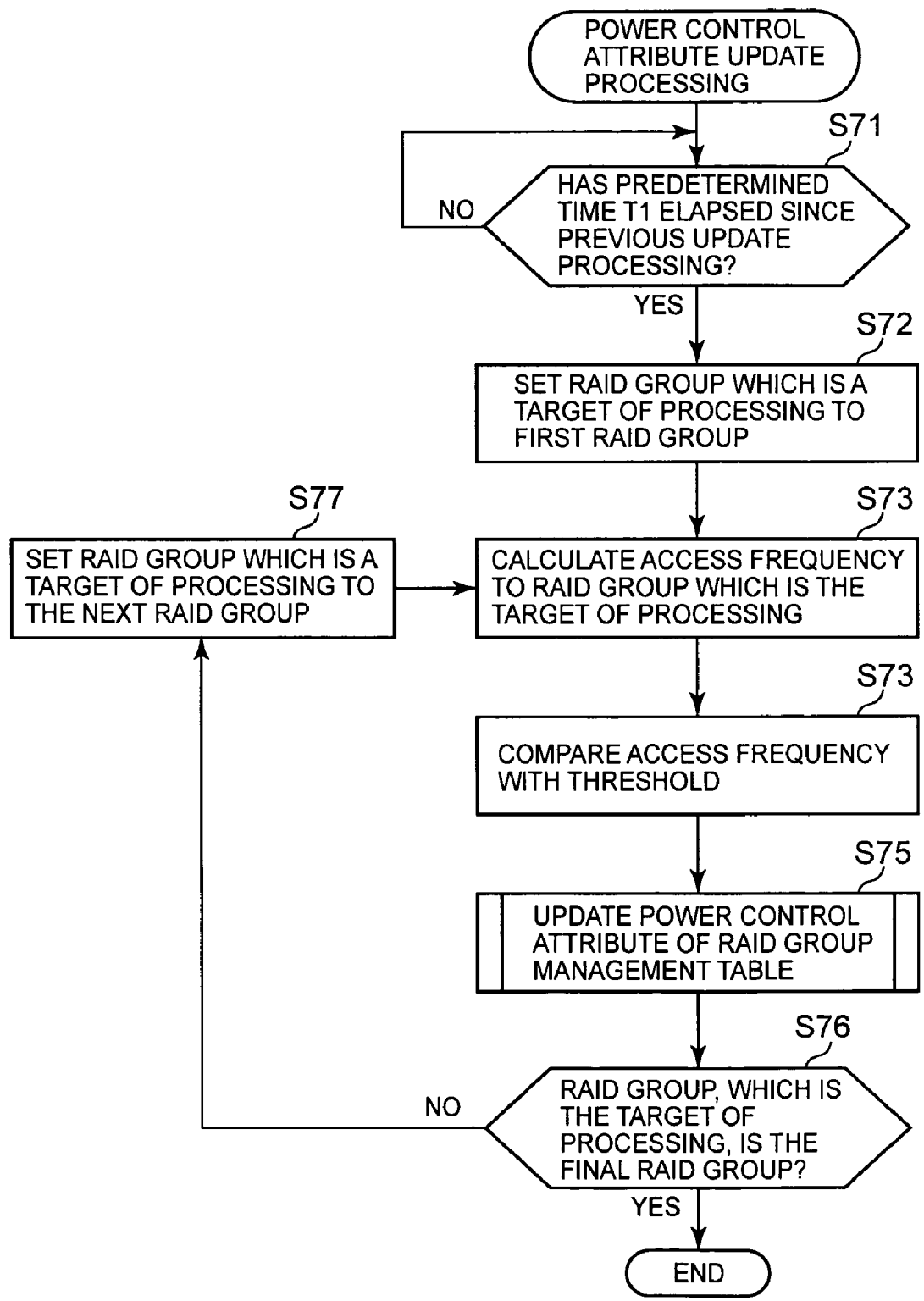
FIG. 19 is a flow chart showing a processing for updating a power control attribute.

FIG. 19 is a flow chart showing an operation of the power control attribute update processing 164. In this processing 164, on the basis of time fluctuation of access patterns for accessing a RAID group 220, the power control attribute of the RAID group 220 is updated.

The processing 164 is executed every time when a predetermined time period t1 elapses (S71). For example, this processing 164 can be executed every other day. The user can set a value of the predetermined time period t1 by means of the maintenance terminal 30. It should be noted that, as in the example described hereinafter, a threshold or a value set for the predetermined time period may be configured such that the user can set any values freely or such that a fixed value, which is set in the control portion 160 beforehand, is used. Also, the user may select a value freely from a plurality of values that are provided beforehand.

When the predetermined time period t1 has elapsed since the previous execution time of the power control attribute update processing 164 (S71: YES), the control portion 160 sets a RAID group 220, which is a target of processing, to the RAID group which is registered in the first entry in the RAID group management table 133 (S72).

The control portion 160 then refers to the RAID group access pattern management table 131 to calculate access frequency of the RAID group 220 which is the target of processing (S73). Specifically, the control portion 160 calculates the percentage of time zones (access frequency) in which the value of the access information is set to "there is access" during, for example, a predetermined period of time in the past day. For example, in the case of a RAID group where access is present for the total of six hours within 24 hours, the access frequency is 25%.

The control portion 160 compares the calculated access frequency with each of the thresholds TH1 and TH2 that are registered in the threshold management table 137 (S74), and updates the power control attribute of the RAID group 220 (S75). The step S75 will be described in more detail. The control portion 160 the judges whether the RAID group 220, which is the target of processing, is the last RAID group 220 registered in the RAID group management table 133 (S76). If there is an undetermined RAID group 220 (S76: NO), the control portion 160 switches the RAID groups as the target of processing to the next RAID groups, and executes the steps of S73 through S76. In this manner, for all the RAID groups 220 that are registered in the RAID group management table 133, appropriate power control attributes are set.

Figure 20:
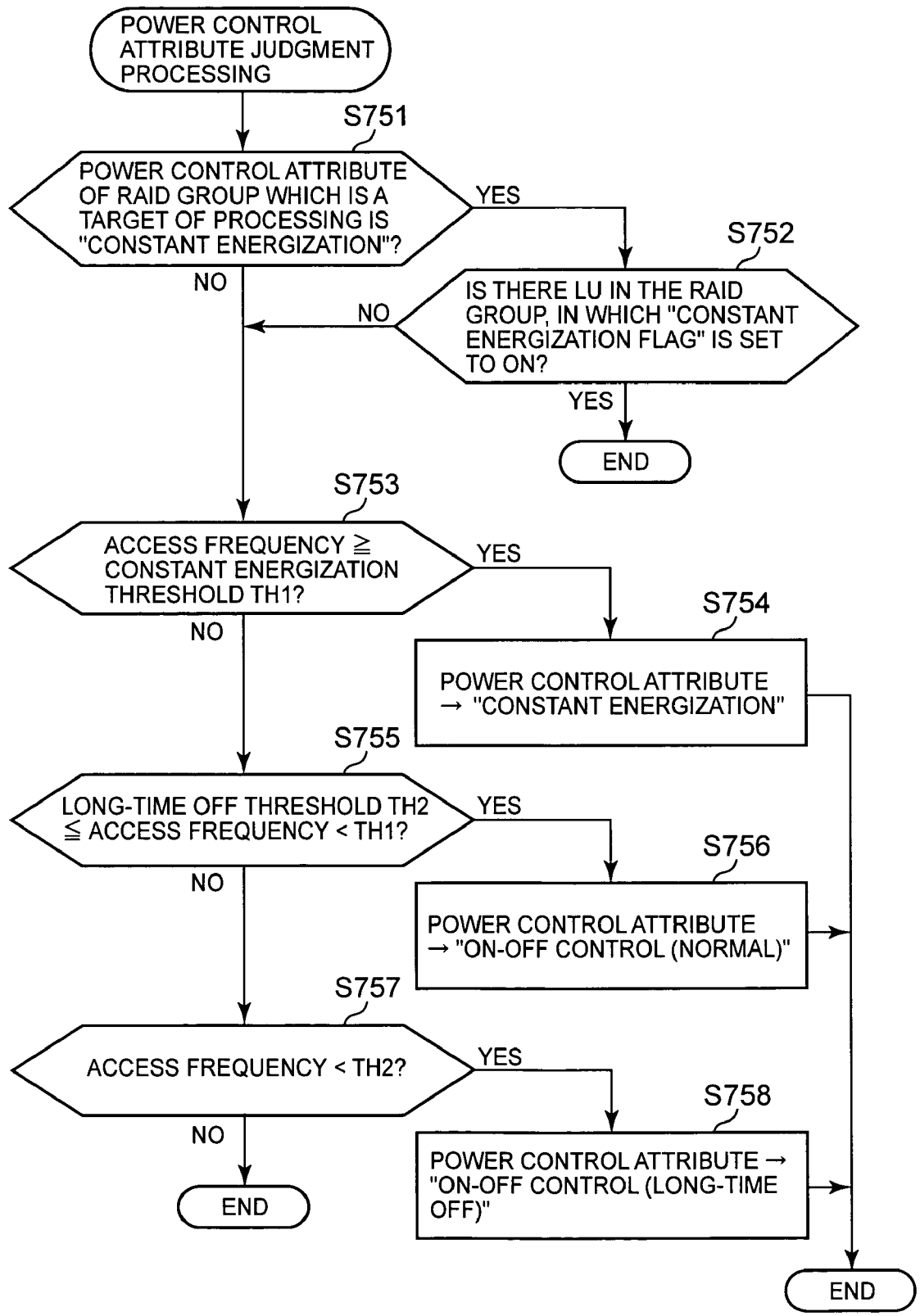
FIG. 20 is a flow chart showing the detail of S75 in FIG. 19.

FIG. 20 is a flow chart showing the detail of S75 in FIG. 19. When the power control attribute is already set to "constant energization" in a RAID group 220 which is the target of processing (S751: YES), and when the logical volume 230 with "ON" constant energization flag is already present in this RAID group 220 (S752: YES), the control portion 160 judges that this RAID group 220 is not to be subjected in this processing.

The reason is to keep the RAID group 220, which has the logical volume 230 in which "ON" is set as the constant energization flag, in the state of "constant energization." If the power control attribute of the RAID group 220, which is set to "constant energization," is changed to other than "constant energization," the logical volume provided in this RAID group 220 (the logical volume in which the constant energization flag is set to "ON") has to be moved to the RAID group 220 which is in another "constant energization" state. This, however, complicates the processing, thus the RAID group 220 which satisfies the conditions of S751 and S752 is not treated as a target of judgment for the power control attribute.

When the access frequency of the RAID group 220, which is the target of processing, is at least the constant energization threshold TH1 (S753: YES), the control portion 160 updates the power control attribute of this RAID group 220 to "constant energization" (S754).

When the access frequency of the RAID group 220, which is the target of processing, is less than the long-time OFF threshold TH2 (S757: YES), the control portion 160 updates the power control attribute of this RAID group 220 to "ON-OFF control (long-time OFF)" (S758).

When the access frequency of the RAID group 220, which is the target of processing, is between the constant energization threshold TH1 and the long-time OFF threshold TH2 (S755: YES), the control portion 160 updates the power control attribute of this RAID group 220 to "ON-OFF control (normal) (S756). In this manner, an appropriate power control attribute is set in accordance with the access frequency of each of the RAID groups 220.

Figure 21:
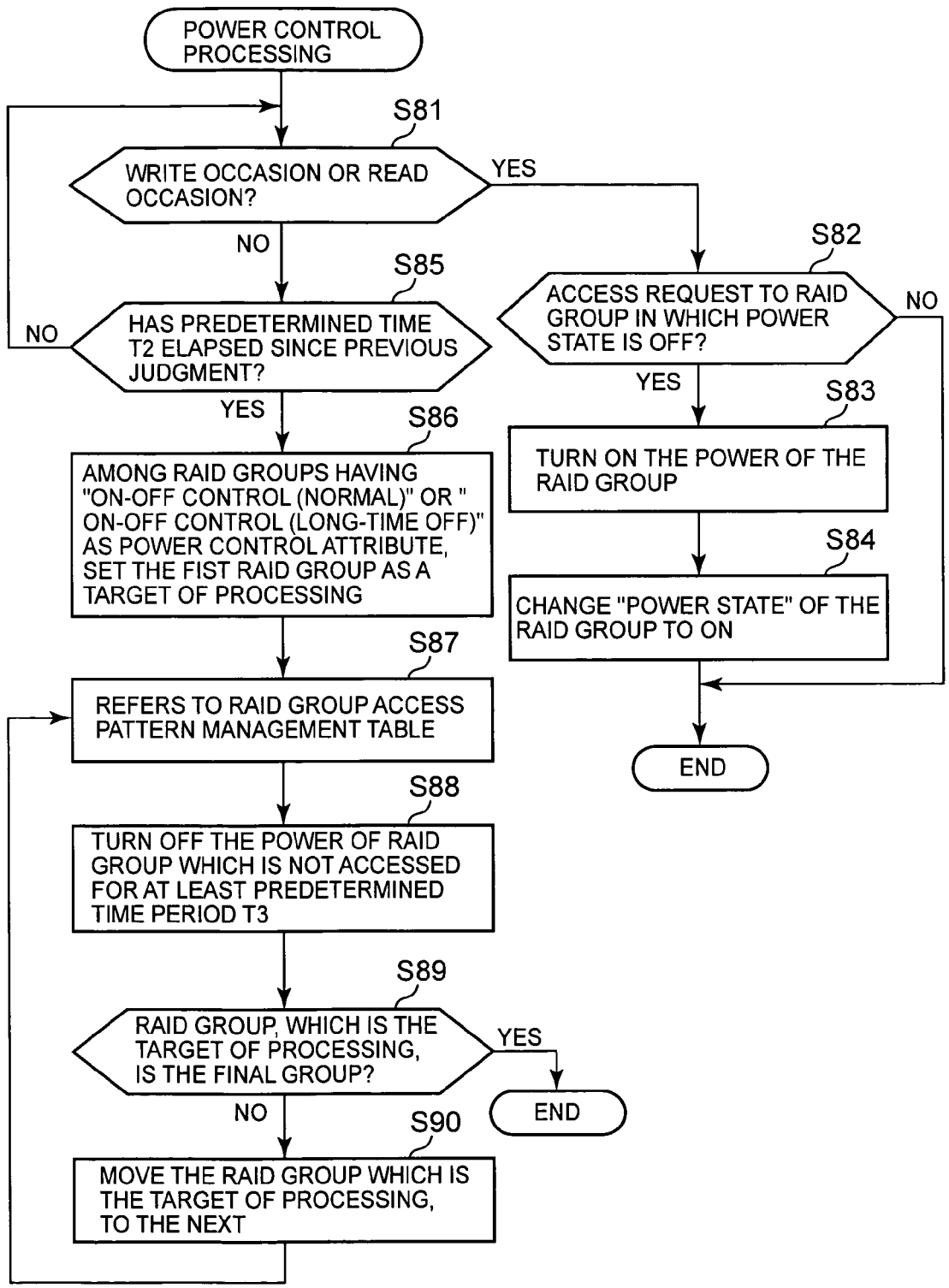
FIG. 21 is a flow chart showing a power control processing.

FIG. 21 is a flow chart showing an operation of the power control processing 165. The processing 165 is activated in various occasions. The first occasion is when the access request from the host 20 is detected (S81 through S84). The second occasion is when a predetermined time period t2 has elapsed since previous execution (S85 through S90). The predetermined time period t2 can be set to a relatively short time period such as approximately one minute.

The first occasion is for starting to supply power, and the second occasion is for stopping the supply of power.

First of all, the first occasion is described. When the access request from the host 20 is detected (S81: YES), the control portiol 160 judges whether the access request is for the RAID group 220 in which the power is OFF (S82). When the access request is for the RAID group 220 in which the power is OFF (S82: YES), the control portion 160 turns ON the power of each of the disk drives 210 configuring this RAID group 220 (S83), and updates the "power state" of this RAID group 220 to ON (S84).

Next, the second occasion is explained. Even when the access request from the host 20 is not detected (S81: NO), when the predetermined time period t2 has elapsed since the previous power control processing (S85: YES), this processing 165 is executed. When the processing 165 is executed in the second occasion, only the RAID group in which "ON-OFF control (normal)" or "ON-OFF control (long-time OFF)" is set as the power control attribute is used as a target of processing.

The control portion 160 selects a RAID group 220 from among the RAID groups 220 that are registered in the RAID group management table 133, and sets the first RAID group 220 in which "ON-OFF control (normal)" or "ON-OFF control (long-time OFF)" is set as the power control attribute, as the RAID group which is the target of processing (S86).

The control portion 160 refers to the RAID group access pattern management table 131 (S87) to acquire the last time when the RAID group 220, which is the target of processing, is accessed. The control Portion 1 160 then calculates the difference between the last access time and the present time, and, when there is no access for a predetermined time period t3 (approximately for 20 minutes, for example), switches the power of this RAID group 220 OFF (S88). Accordingly, energization to each of the disk drives 210 configuring the RAID group 220, which is not accessed for the predetermined time period t3 or more, is stopped.

The control portion 160 judges whether or not the power control is performed for all the RAID groups 220 that are the target of processing (S89), and, if there is an undetermined RAID group 220 (S89:NO), repeats the steps S87 through S89. When the power control is performed for all the RAID groups 220 that are the target of processing (S89: YES), the control portion 160 ends this processing.

In this manner, when the access request is sent to the RAID group 220 in which the power is OFF, each of the disk drives 210 configuring this RAID group 220 is energized, and each of the disk drives 210 configuring the RAID group 220 which is not accessed for the predetermined time period t3 or more is stopped being energized. Accordingly, control of power supply can be performed appropriately in so-called an on-demand fashion in accordance with the access status.

Figure 22:
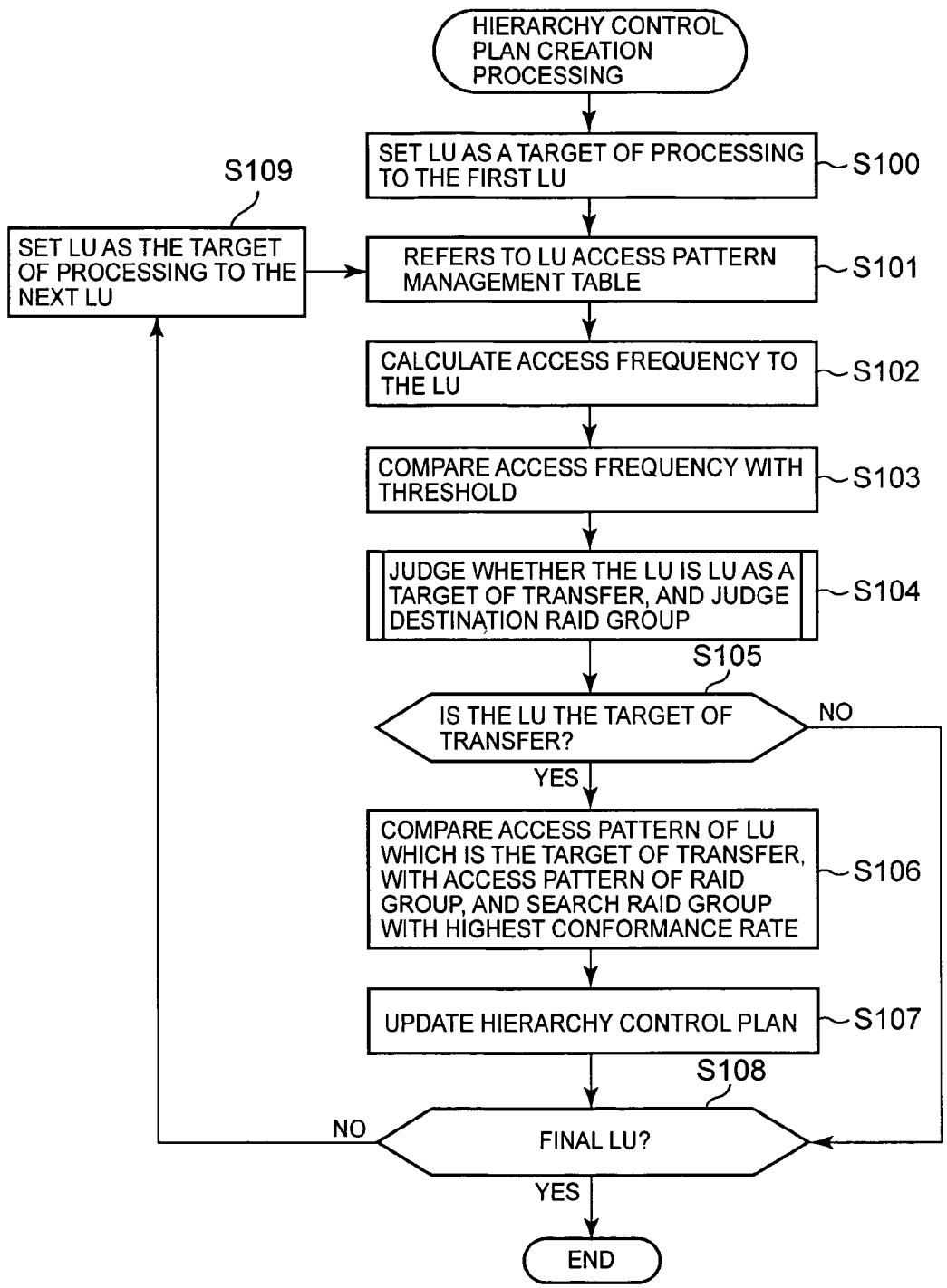
FIG. 22 is a flowchart showing a hierarchy control plan creation processing.

FIG. 22 is a flow chart showing an operation of the hierarchy control plan creation processing 166. In this processing 166 a logical volume 230 is relocated in an appropriate RAID group 220 on the basis of the access status of the logical volume 230.

First, the control portion 160 sets the first logical volume 230 of the logical volumes 230 that are registered in the LU management table 135, as the logical volume which is the target of processing (S100).

The control portion 160 refers to the LU access pattern management table 132 to calculate the access frequency of the logical volume 230 which is the target of processing. For example, the control portion 160 refers to the access information during a predetermined period of time (for example, 24 hours) regarding this logical volume which is the target of processing, and calculates the percentage of a time zone of "there is access" in this predetermined period of time. For example, if the total hour of the time zone where there is access in 24 hours is three hours, the access frequency of the logical volume is 12.5%.

The control portion 160 compares the calculated access frequency with each of the thresholds TH1 and TH2 (S103), and judges whether the logical volume 230, which is the target of processing, should be moved, and, if it is moved, judges which rank (RAID group) to move (S104). S104 will be further described.

Next, the control portion 160 judges whether or not the logical volume 230, which is the target of processing, is selected as the target of transfer (S105). If the logical volume 230 is the target of transfer (S105: YES), the control portion 160 refers to each of the access pattern management tables 131 and 132, and thereby compares the access pattern of this logical volume 230 with the access pattern of each of the RAID groups 220 selected as candidates for the transfer. The control portion 160 selects any one of the RAID group 220 having the access pattern that matches most with the access pattern of the logical volume 230 which is the target of transfer (S106).

The control portion 160 compares the access information about the logical volume 230, which is the target of transfer, and the access information about each of the RAID groups 220 extracted as the candidates for the transfer, with respect to the predetermined time period (for example, 24 hours), and calculates conformance rates respectively. The control portion 160 then determines one RAID group 220 with the maximum conformance rate.

However, a rate of conformance between the LU, which is the target of transfer, and the RAID group 220 to which the LU as the target of transfer belongs is calculated as follows. In other words, instead of the access information of this RAID group 220, access information which is obtained as follows is used. Specifically, access information in a certain time zone is judged as "there is access" if "there is access" is contained in the access information of the LU other than the LUs which are the target of transfer and contained in the RAID group 220, or, if not, judged as "there is no access."

In other words, if the RAID group to which the LU as the target of transfer belongs is referred to as an assignment destination RAID group, an access pattern of the assignment destination RAID group is detected in a state where it is assumed that the LU, which is the target of transfer, is removed from the assignment destination RAID group.

If the LU, which is the target of transfer, is not removed to detect an access pattern of the assignment destination RAID group, the LU as the target of transfer remains to be reflected in the access pattern of the assignment destination RAID group. In this case, the rate of conformance between the access pattern of the LU as the target of transfer and the access pattern of the assignment destination RAID group becomes unreasonably high. Therefore, when detecting an access pattern of the assignment destination RAID group, the access pattern of the LU as the target of transfer is eliminated.

In this manner, by selecting a RAID group 220 having the most suitable access pattern as the destination RAID group 220, logical volumes 230 having the similar access pattern are brought together to a single RAID group 220. As a result, ON-OFF control of the power of the RAID group 220 can be performed efficiently. On the other hand, if logical volumes 230 having different access patterns exist in the same RAID group 220, the powers of all the disk drives 210 configuring this RAID group 220 are switched ON only when the access request to a single logical volume 230 is generated.

Once determining a RAID group 220 to which the logical volume 230 as the target of transfer should be moved, the control portion 160 adds an entry to the hierarchy control plan table 134, and sets each value (S106). Specifically, the control portion 160 stores a volume number that identifies the source logical volume 230 and a volume number that identifies the destination logical volume 230 in the hierarchy control plan table 134. Although FIG. 9 shows only the source and destination volume numbers, the group number of the RAID group 220 to which the source logical volume 230 belongs, and the group number of the RAID group 220 to which the destination logical volume 230 belongs are stored together in the hierarchy control plan table 134.

The control portion 160 judges whether possibility of relocating all of the logical volumes 230 is determined or not (S108). If there is an undetermined logical volume 230 remained (S108: NO), the control portion 160 selects the next logical volume 230 as a logical volume which is a target of processing (S109), and repeats the processings of S101 through S107. If a judgment is made for all of the logical volumes 230 (S108: YES), the control portion 160 ends this processing.

Figure 23:
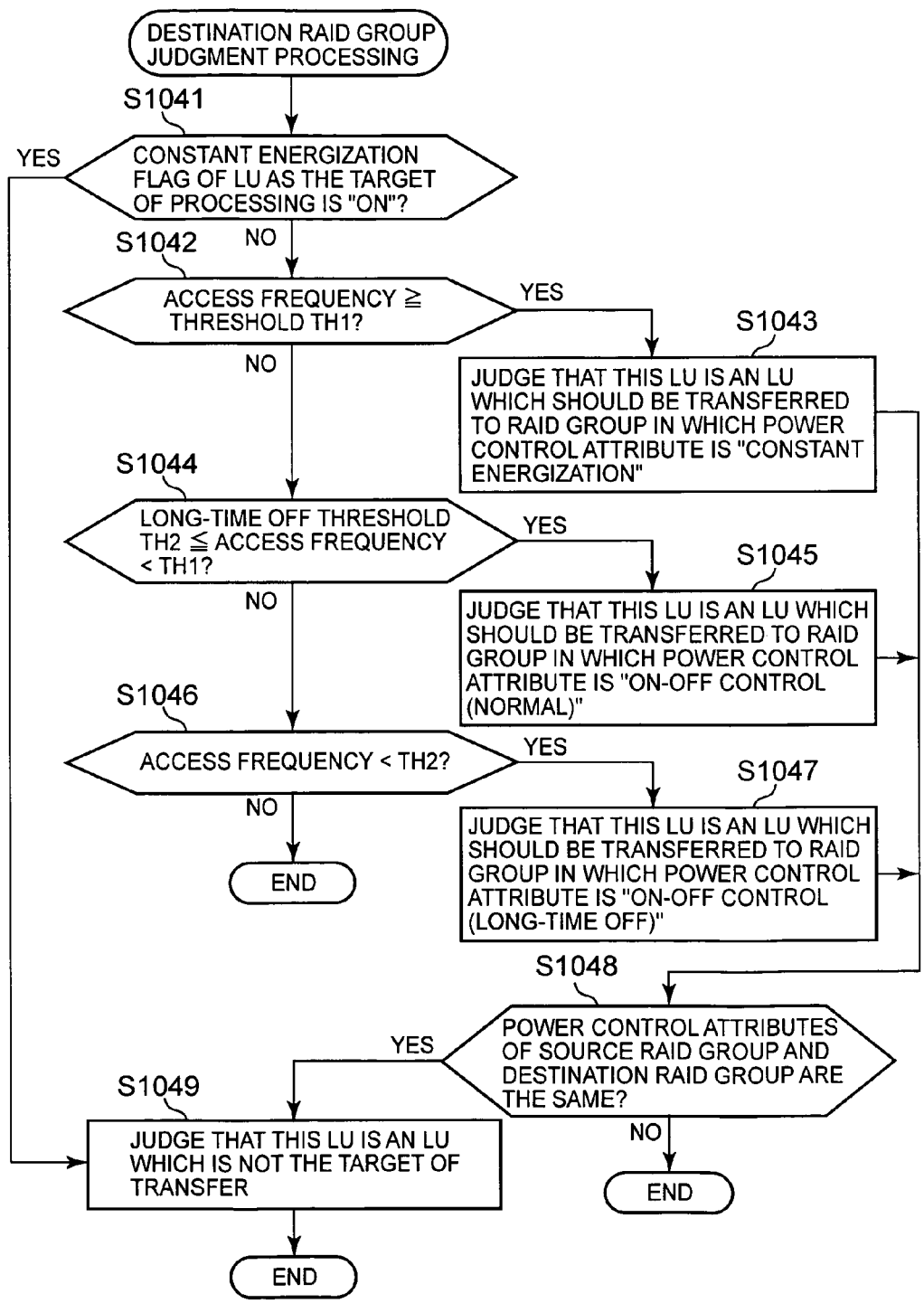
FIG. 23 is a flow chart showing the detail of S104 in FIG. 22.

FIG. 23 is a flow chart showing a detail of S104 shown in FIG. 22. First, the control portion 160 judges whether "ON" is set as the constant energization flag of the logical volume 230 which is the target of processing (S10411). If "ON" is set as the constant energization flag, it means that the destination for relocating this logical volume 230 is fixed to the RAID group 220 which is in the sate of "constant energization." Therefore, the control portion 160 judges that the logical volume 230 in which the constant energization is set to ON is a volume which is not the target of processing (S1049), and then ends the processing.

When "OFF" or "invalid value" is set as the constant energization flag of the logical volume 230 which is the target of processing, the control portion 160 determines a destination RAID group 220 for the logical volume 230 which is the target of processing.

When the access frequency of the logical volume 230 which is the target of processing is at least the constant energization threshold TH1 (S1042:YES), the control portion 160 judges whether or not this logical volume 230, which is the target of transfer, should be disposed in the RAID group 220 in which the power control attribute is set to "constant energization" (S1043).

If the access frequency of the logical volume 230 which is the target of transfer is less than the long-time OFF threshold TH2 (S1046:YES), the control portion 160 judges whether or not this logical volume 230, which is the target of transfer, should be disposed in the RAID group 220 in which the power control attribute is set to "ON-OFF control (long-time OFF)" (S1047).

If the access frequency of the logical volume 230 which is the target of transfer is at least the long-time OFF threshold TH2 and less than TH1 (S1044:YES), the control portion 160 judges whether or not this logical volume 230, which is the target of transfer, should be disposed in the RAID group 220 in which the power control attribute is set to "ON-OFF control (normal)" (S1045).

The control portion 160 compares the power control attribute of the RAID group (source RAID group) in which the logical volume 230, which is the target of transfer, is currently disposed with the power control attribute of the RAID group (destination RAID group) which is selected as the destination for relocating the logical volume 230 which is the target of transfer (S1048). When the power control attribute of the source RAID group matches with the power control attribute of the destination RAID group (S1048: YES), the control portion 160 judges that the logical volume 230 is a volume which is not the target of transfer, and ends this processing. This is because there is not reason for relocation if no change is observed before and after transferring the volume, in other words, if the logical volume 230 stays in the same rank.

Figure 24:
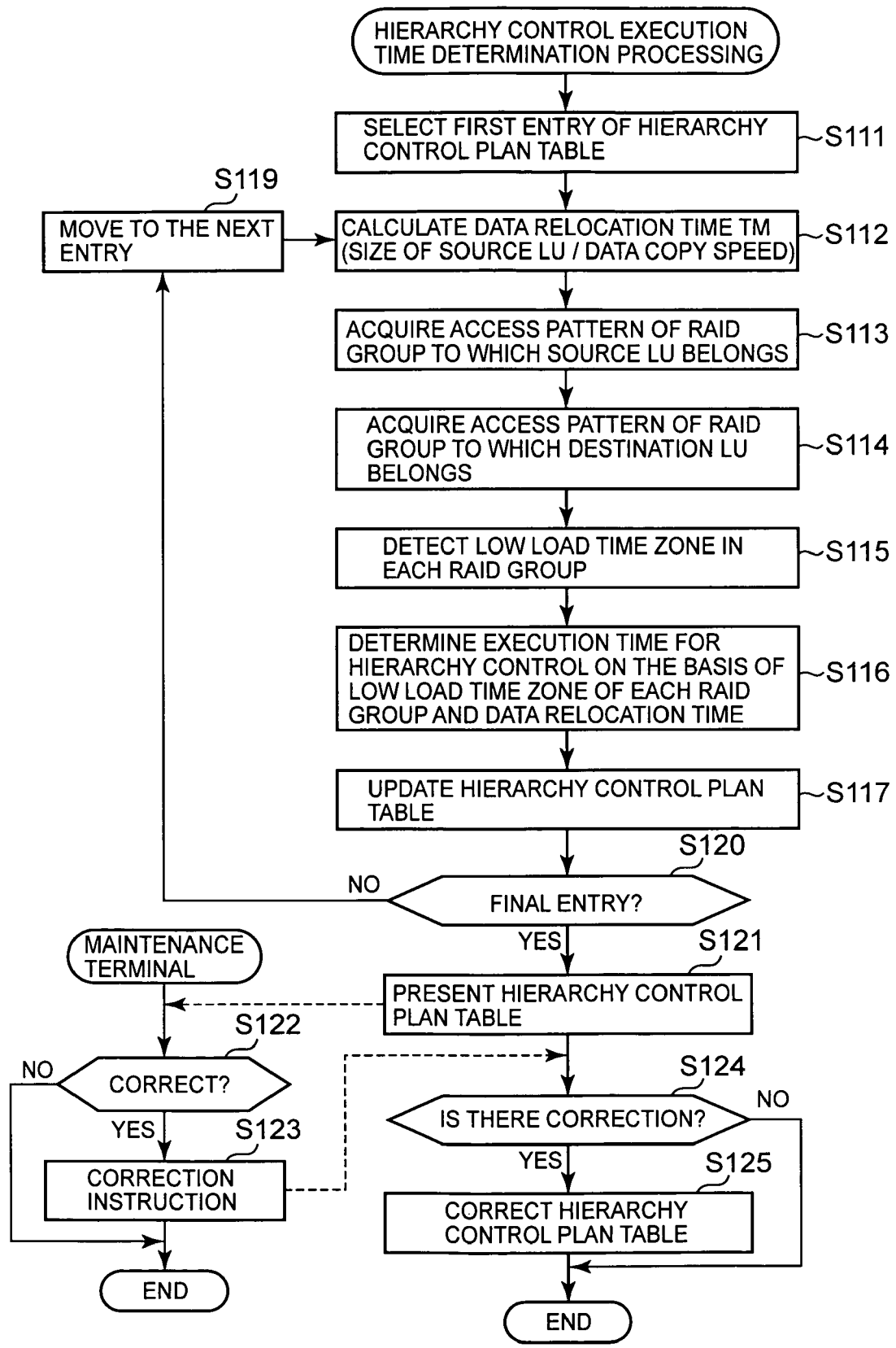
FIG. 24 is a flow chart showing a processing for determining a hierarchy control execution time.

FIG. 24 is a flow chart showing an operation of the hierarchy control execution time determination processing 167. In this processing 167, a time for executing a created hierarchy control plan is determined.

First, the control portion 160 selects a first entry of the hierarchy control plan table 134 (S111), and takes it as a target for judging a transfer time.

The control portion 160 calculates time (data relocation time TM) which is required for moving the data stored in the source logical volume 230 which is registered in the entry (S112). The data relocation time TM can be obtained by, for example, measuring, beforehand, an average transfer speed Vc which is required for data copy, and thereafter dividing a volume size Sv as a target of transfer by the average transfer speed Vc (TM=Sv/Vc).

The control portion 160 refers to the RAID group access pattern management table 131, and thereby acquires an access pattern of the source RAID group 220 and an access pattern of the destination RAID group 220 (S113, S114). The control portion 160 then detects a low load time zone in the source RAID group 220 and a low load time zone in the destination RAID group 220 (S115).

The control portion 160 determines a time preferred for performing hierarchy control, on the basis of each of the low load time zones and the data relocation time TM (S116), and registers the determined time in the hierarchy control plan table 134 (S117).

For example, the control portion 160 refers to the access information of a predetermined time period (for example, the access information from the past day), and searches a period of time in which the least number of the values of "there is access" is observed, whereby the transfer time can be determined. As the number of values of "there is access," the sum of the number of values of "there is access" in the source RAID group 220 and the number of values of "there is access" in the destination RAID group 220 is used. The reason for using the sum of the numbers is because it is considered that the searched time is when the loads of the source and destination RAID groups 220 are low.

It should be noted that it is only necessary to discriminate the time in which the loads of the source and destination RAID groups 220 are low, thus the process of doing so is not limited to the above-described example. For example, the number of accesses is also stored as the access information, a time having the least sum of numbers of accesses may be selected. Alternatively, the transfer time may be determined on the basis of the load state of the source RAID group 220 or the destination RAID group 220. Furthermore, since the most access patterns have, for example, a periodicity, the execution time may be determined in consideration of the periodicity. For example, the state of the load can be judged by referring to the history of a past access pattern corresponding to a day of the week in which the execution time is set.

The control portion 160 judges whether or not the transfer time is determined for all the entries in the hierarchy control plan table 134 (S120). If there is an undetermined entry (S120: NO), the control portion 160 moves to the next entry, and executes the steps of S112 through S117.

Once the transfer time is set for each entry in the hierarchy control plan table 134 in the above manner (S120: YES), this hierarchy control plan table 134 is transmitted to the maintenance terminal 30 and presented to the user (S121).

The user may accept this presented hierarchy control plan table 134 as is (S122: NO), or manually correct the execution time and the like. When correcting manually (S122: YES), a correction instruction is outputted from the maintenance terminal 30 to the control portion 160 (S123).

When receiving the correction instruction from the maintenance terminal 30 (S124: YES), the control portion 160 corrects the hierarchy control plan table 134 and saves the updates (S125). When no correction instruction is outputted from the maintenance terminal 30, the control portion 160 ends this processing.

Figure 25:
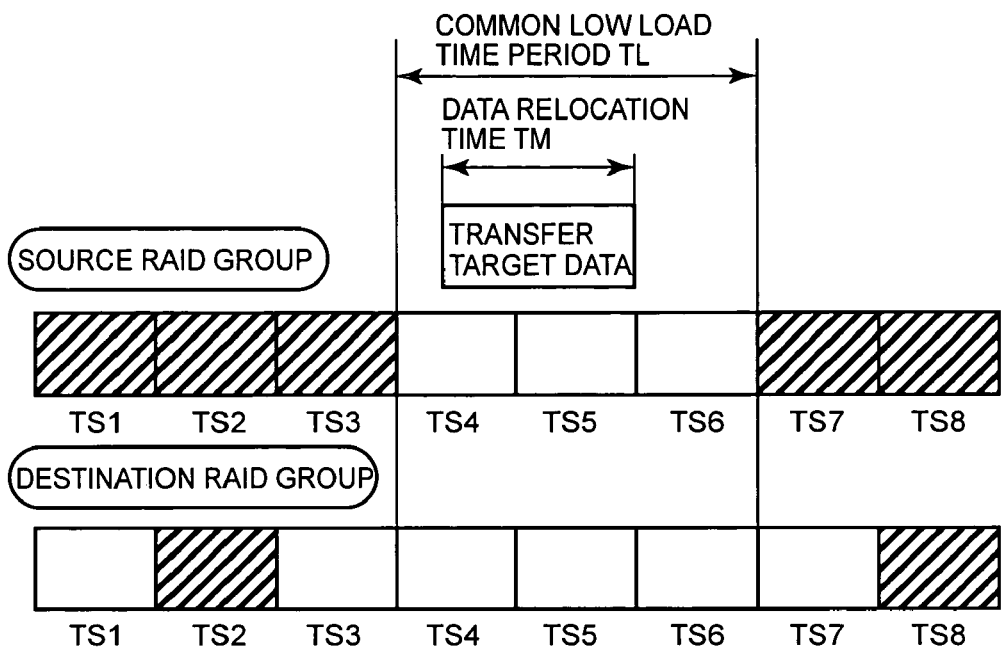
FIG. 25 is an explanatory diagram schematically showing a state in which the hierarchy control execution time is determined.

FIG. 25 is an explanatory diagram showing a state in which the transfer time is set to a time in which the load of the source RAID group and the load of the destination RAID group are low. In the figure, time zones TS with diagonal lines indicate that the access request is generated. White time zones TS indicated that there is no access request.

In the period of time from the time zones TS4 through TS6, the load of the source RAID group and the load of the destination RAID group are low. This time period from TS4 through TS6 can be called "common low load time period (common low load time zone) TL." The control portion 160 determines the transfer time by making the most of this time period TL.

Figure 26:
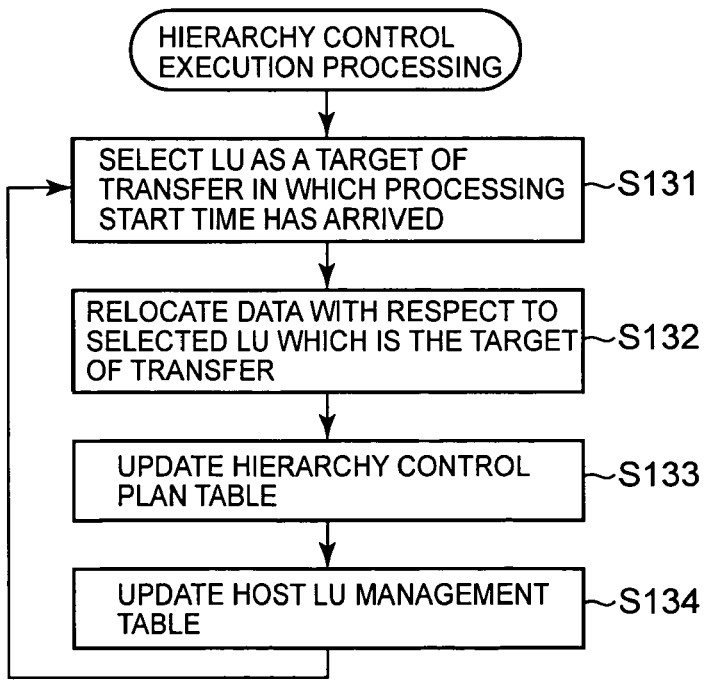
FIG. 26 is a flow chart showing a hierarchy control execution processing.

FIG. 26 is a flow chart showing an operation of the hierarchy control execution processing 168. The control portion 160 refers to the hierarchy control plan table 134 and selects a logical volume 230 for which the execution time of relocation has come (S131).

The control portion 160 transfers the data of the selected logical volume 230 to the destination volume 230 provided in the destination RAID group 220, and copies the data (S132). When the data copy is completed, the control portion 160 deletes the entry of finished volume relocation from the hierarchy control plan table 134, and updates the hierarchy control plan table 134 (S133). The control portion 160 further rewrites and updates the host LU management table 136 so that the host 20 can continuously use the transferred logical volume 230 (S134). Specifically, the volume number of the destination logical volume 230 is related to the host LU which is associated with the source logical volume 230. Thereafter, the host 20 accesses the destination logical volume 230. It should be noted that the host 20 does not consider relocating the volumes, because there is no change in the volume numbers which are recognized by the host 20.

Figure 27:
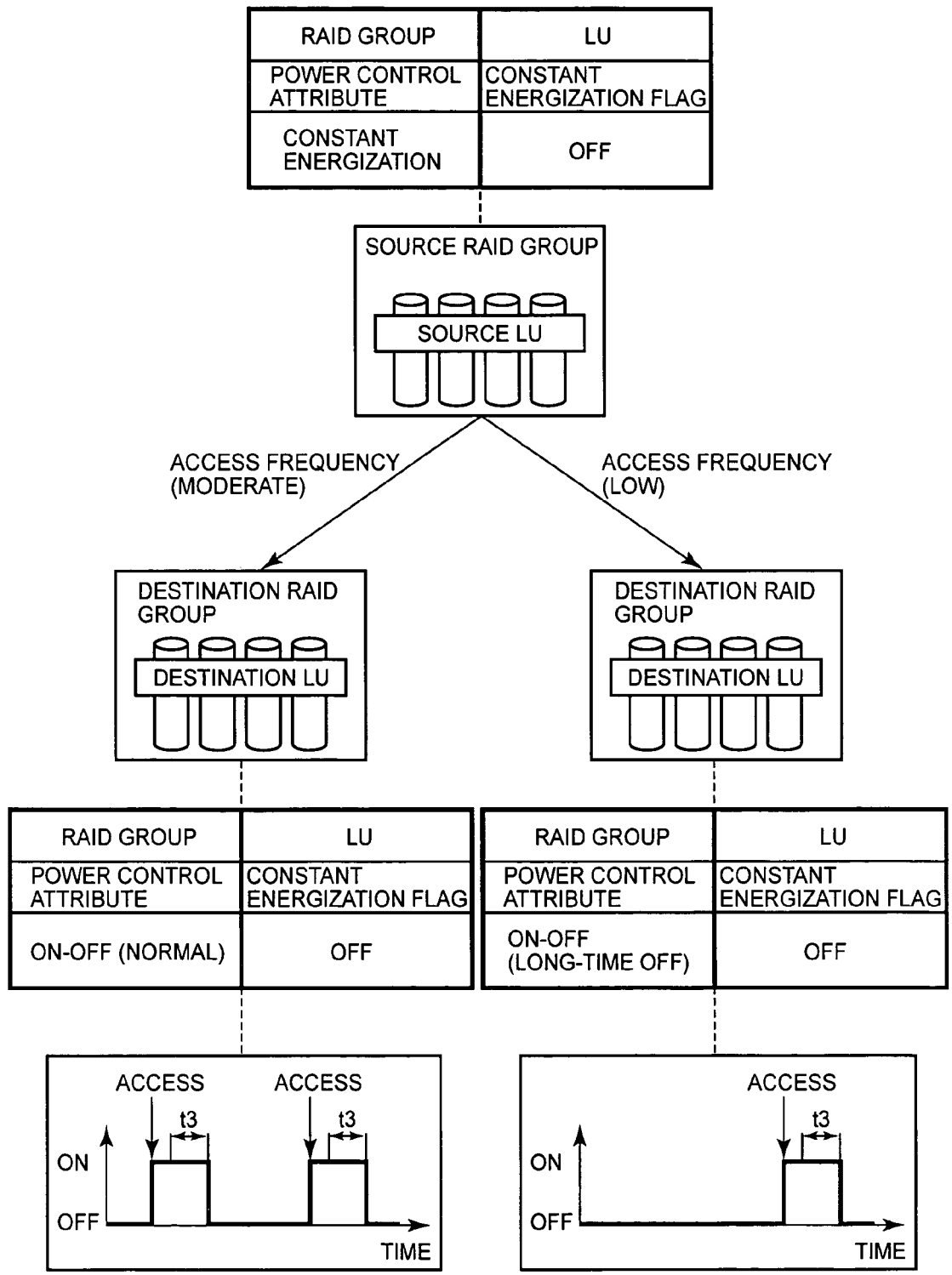
FIG. 27 is an explanatory diagram schematically showing hierarchy control when a source RAID group is set to "constant energization;"
Figure 28:
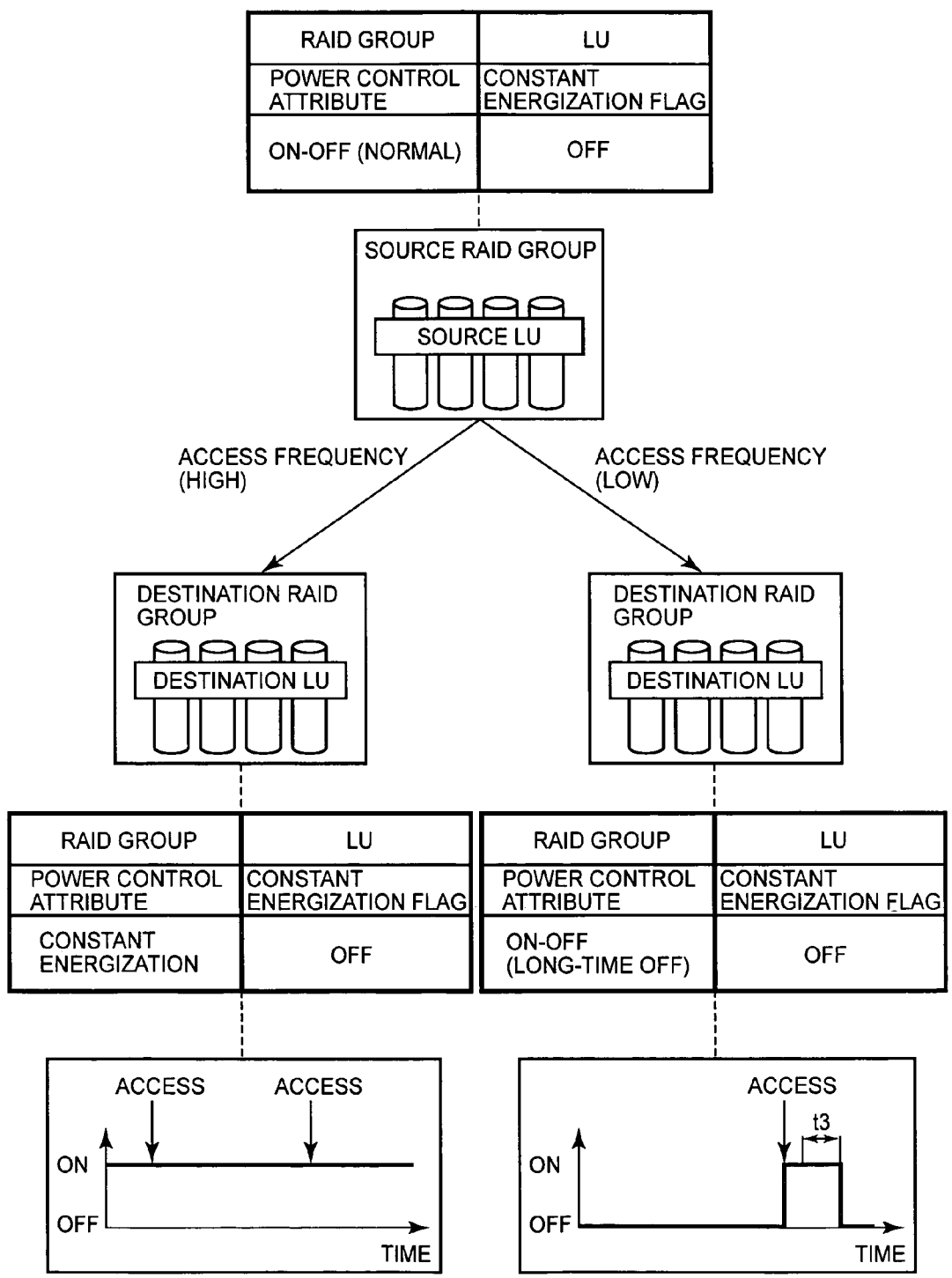
FIG. 28 is an explanatory diagram schematically showing hierarchy control when the source RAID group is set to "ON-OFF control (normal);"
Figure 29:
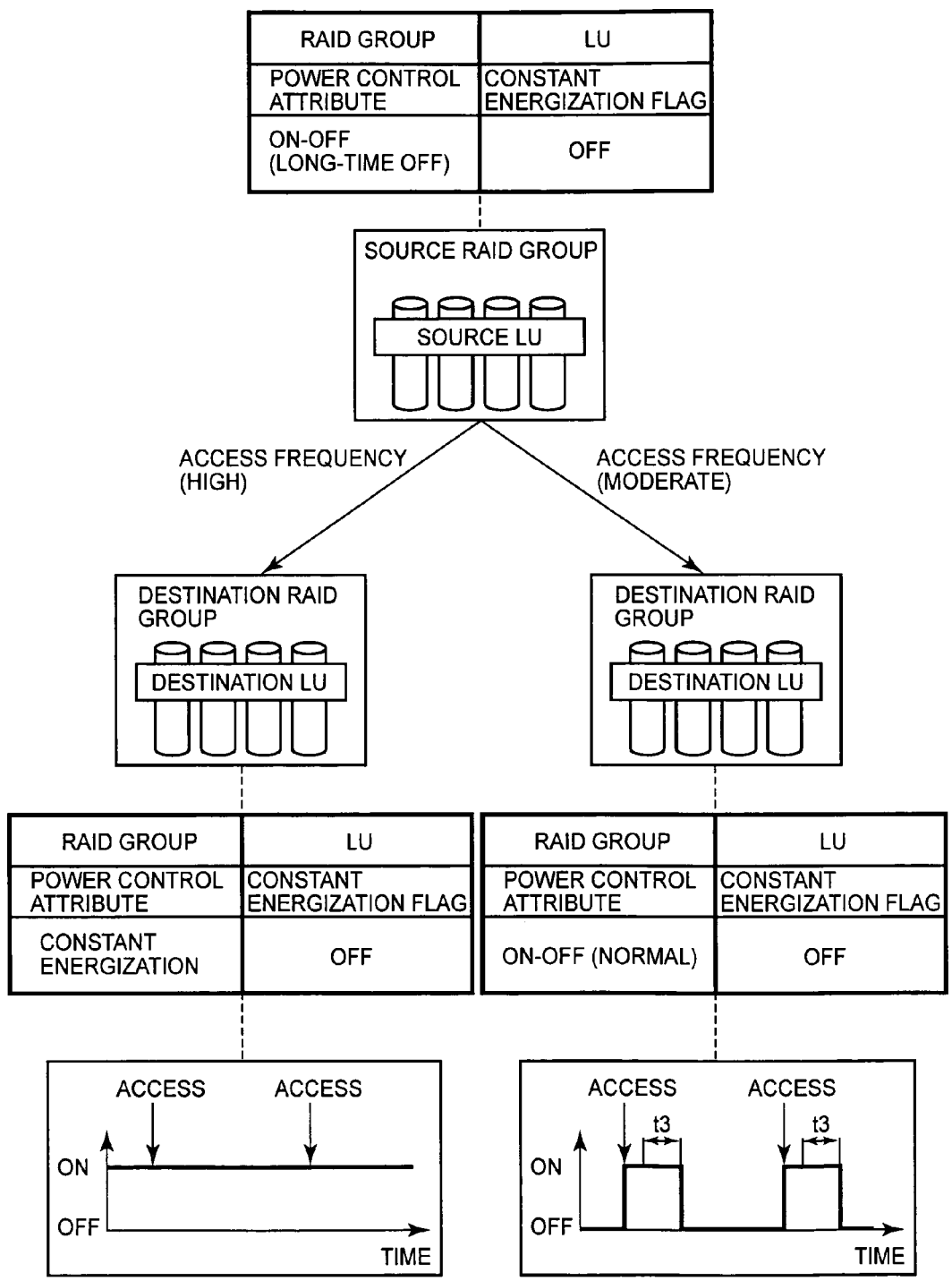
FIG. 29 is an explanatory diagram schematically showing hierarchy control when the source RAID group is set to "ON-OFF control (long-time OFF)

FIG. 27 through FIG. 29 are explanatory diagrams showing a state of volume relocation (hierarchy control). FIG. 27 shows a case in which the logical volume 230 in which the constant energization flag is set to OFF is originally provided in the RAID group 220 which is in the state of "constant energization."

When the access frequency to the source logical volume 230 (constant energization flag: OFF) is moderate (a moderate value between TH1 and TH2), the source logical volume 230 is transferred to the RAID group 220 which is set to "ON-OFF control (normal)." The value of the constant energization flag is not changed.

When the host 20 accesses the destination logical volume 230 after the transfer, the power of each of the disk drives 210 configuring the destination RAID group 220 is switched ON. After the predetermined time t3 elapses since the access has finished, the power of each of the disk drives 210 is turned OFF. Therefore, each disk drive 210 is energized only when necessary, thus each disk drive 210 is prevented from being operated wastefully to shorten the life thereof, and the electricity is prevented from being wasted.

On the other hand, in the case of low access frequency to the source logical volume 230 (less than TH2), the source logical volume 230 is transferred to the RAID group 220 which is set to "ON-OFF control (long-time OFF)." When the host 20 accesses the destination logical volume 230 after the transfer, the power of each of the disk drives 210 configuring the destination RAID group 220 is switched ON. After the predetermined time t3 elapses since the access has finished, the power of each of the disk drives 210 is turned OFF. The logical volumes 230 with low access frequency are automatically collected in the RAID group 220 which is set to "ON-OFF control (long-time OFF)," thus the time when power is supplied to this RAID group 220 becomes relatively short.

FIG. 28 shows a case in which the logical volume 230 in which the constant energization flag is set to OFF is originally provided in the RAID group 220 which is in the state of "ON-OFF control (normal)." When the access frequency to the source logical volume 230 is high (at least TH1), the source logical volume 230 is transferred to the RAID group 220 which is set to "constant energization." Since this RAID group 220 is supplied with power constantly, a high-speed response to the access from the host 20 is possible.

On the other hand, in the case of low access frequency to the source logical volume 230 (less than TH2), the source logical volume 230 is transferred to the RAID group 220 which is set to "ON-OFF control (long-time OFF)."

FIG. 29 is an explanatory diagram showing a case in which the logical volume 230 in which the constant energization flag is set to OFF is originally provided in the RAID group 220 which is in the state of "ON-OFF control (long-time OFF)." When the access frequency to the source logical volume 230 is high (at least TH1), the source logical volume 230 is transferred to the RAID group 220 which is set to "constant energization."

On the other hand, when the access frequency to the source logical volume 230 is moderate (at least TH1 and less than TH2), the source logical volume 230 is transferred to the RAID group 220 which is set to "ON-OFF control (normal)."

Figure 30:
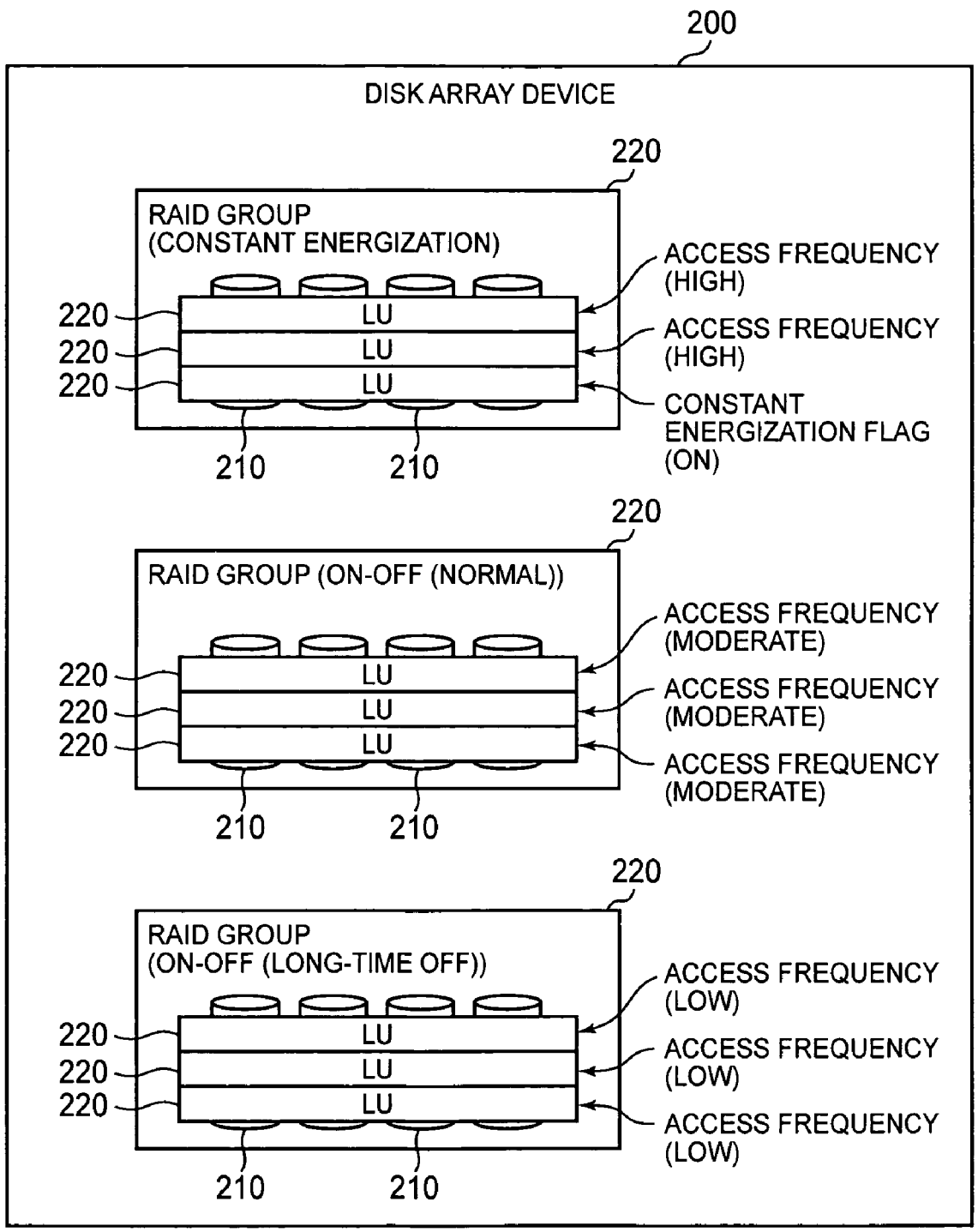
" and FIG. 30 is an explanatory diagram schematically showing a result of executing the hierarchy control.

FIG. 30 is an explanatory diagram which schematically shows a data allocation structure inside the disk array device 200 in the case where the above-described hierarchy control is performed once or more than once. In the RAID group 220 which is set to "constant energization," the logical volume 230 with high access frequency and the logical volume 230 in which "constant energization flag" is set to ON are disposed. Therefore, high-speed responsiveness can be secured in the case of the logical volumes with high access frequency and the logical volumes which are require to respond at high speeds.

In the RAID group 220 which is set to "ON-OFF control (normal)," the logical volume 230 with moderate access frequency is disposed. Therefore, each of the disk drives 210 configuring this RAID group 220 may be energized only when the access request is generated from the host 20, otherwise the power of each of the disk drives 210 is held in the ON position.

In the RAID group 220 which is set to "ON-OFF control (long-time OFF)," the logical volume 230 with low access frequency is disposed. Therefore, each of the disk drives 210 configuring this RAID group 220 does not have to be supplied with power for a long period of time.

Since the present embodiment is configured in the above-described fashion, the following effects are obtained. In the present embodiment, an appropriate power control attribute is set for each RAID groups 220 on the basis of the access frequency of the each RAID group 220, whereby supply of power is controlled. Moreover, in the present embodiment each logical volume 230 is relocated in an appropriate rank (RAID group) on the basis of the access frequency of the each logical volume 230. By combining the power control and the volume relocation, a logical volume 230 can be disposed in a RAID group 220 corresponding of the access frequency of the logical volume 230. Furthermore, each disk drive 210 is prevented from being energized wastefully, and the life of the each disk drive 210 can be increased. As a result, the reliability of the storage controller 10 can be improved, and electricity consumption on the storage controller 10 can be reduced.

The present embodiment is configured such that a time zone in which the loads (access frequency) of the source RAID group 220 and the destination RAID group 220 are low is selected to determine the execution time for executing the hierarchy control. Therefore, through the execution of the hierarchy control, the responsiveness of each of the source and destination RAID groups 220 can be prevented form being deteriorated, and the usability is improved.

The present embodiment is configured such that a new logical volume 230 is generated prior to the RAID group 220 which is set to "constant energization." Therefore, the access patterns of the new logical volume 230 can be collected and utilized in subsequent preparation of a volume relocation plan.

The present embodiment is configured such that the logical volume 230 in which the constant energization flag is set to OFF is fixed in the RAID group 220 which is set to "constant energization," and this logical volume 230 is not moved to the RAID group 220 having other power control attributes. Therefore, it is possible to maintain high responsiveness of the logical volume 230 which is required to be accessed at high speeds, and volume allocation is prevented from being carried out wastefully.

It should be noted that the present invention is not limited to the above embodiments. The skilled person can perform various additions and modifications within the scope of the invention.

What is claimed is:

1. A storage controller which is connected to at least one host device and a plurality of storage devices, the storage controller comprising:
    a plurality of physical storage devices, each of which is configured from storage regions of a predetermined number of storage devices among the plurality of storage devices;
    at least one logical storage device which can be set in the storage region of each of the physical storage devices;
    an access information collection portion which collects access information about each of the physical storage devices and each of the logical storage devices on the basis of the status of access from the host device to each of the logical storage devices;
    a power supply mode setting portion which sets a power supply mode for supplying power for each of the physical storage devices on the basis of the access information about each of the physical storage devices;
    a power control portion which controls supply of power to each of the storage devices configuring each of the physical storage devices, on the basis of the set power supply mode;
    a relocation plan creation portion which creates a relocation plan for moving each of the logical storage devices between the physical storage devices having different power supply modes, on the basis of the access information about each of the logical storage devices;
    an execution time determination portion which sets an execution time for executing the created relocation plan; and
    a relocation execution portion which moves a logical storage device, which is judged as a target of relocation from among the logical storage devices, from a source physical storage device to a destination physical storage device, on the basis of the created relocation plan, when the determined execution time comes, wherein (1) the power supply mode setting portion calculates an access frequency to each of the physical storage devices on the basis of the access information about each of the physical storage devices,
        (1-1) sets a long-time energization mode in which a power supply time period is relatively long, for each of the storage devices configuring the physical storage device in which the calculated access frequency is relatively high, and
        (1-2) sets a short-time energization mode in which a power supply time period is relatively short, for each of the storage devices configuring the physical storage device in which the calculated access frequency is relatively low,
    (2) the relocation plan creation portion calculates an access frequency to each of the logical storage devices on the basis of the access information about each of the logical storage devices, to create a relocation plan by:
        (2-1) selecting a physical storage device, which is set to the long-time energization mode, as a destination of the logical storage device in which the calculated access frequency is relatively high; and
        (2-2) selecting a physical storage device, which is set to the short-time energization mode, as a destination of the logical storage device in which the calculated access frequency is relatively low.

2. The storage controller according to claim 1, wherein the relocation plan creation portion creates the relocation plan such that a logical storage device, which is judged to be accessed relatively less frequently from the host device, is caused to move to a physical storage device, which is set to a power supply mode in which a power supply time period is relatively short.

3. The storage controller according to claim 1, wherein the relocation plan creation portion creates the relocation plan such that a logical storage device, which is judged to be accessed relatively frequently from the host device, is caused to move to a physical storage device, which is set to a power supply mode in which a power supply time period is relatively long.

4. The storage controller according to claim 1, wherein the power supply mode setting portion calculates an access frequency to each of the physical storage devices on the basis of the access information about each of the physical storage devices, to set a long-time energization mode in which a power supply time period is relatively long, for each of the storage devices configuring the physical storage device in which the calculated access frequency is relatively high, and set a short-time energization mode in which a power supply time period is relatively short, for each of the storage devices configuring the physical storage device in which the calculated access frequency is relatively low.

5. The storage controller according to claim 4, wherein the relocation plan creation portion creates the relocation plan by calculating an access frequency to each of the logical storage devices on the basis of the access information about each of the logical storage devices, selecting a physical storage device, which is set to the long-time energization mode, as a destination of the logical storage device in which the calculated access frequency is relatively high, and selecting a physical storage device, which is set to the short-time energization mode, as a destination of the logical storage device in which the calculated access frequency is relatively low.

6. The storage controller according to claim 5, wherein, when there are a plurality of physical storage devices with a power supply mode, which are selected as the destination, the relocation plan creation portion selects, from the plurality of physical storage devices, a physical storage device that has an access pattern which matches most with an access pattern for accessing the logical storage device as a destination physical storage device, on the basis of the access information about each of the physical storage devices and the access information about each of the logical storage devices.

7. The storage controller according to claim 4, wherein the short-time energization mode is set as a mode of supplying power only when access is requested from the host device.

8. The storage controller according to claim 4, wherein the short-time energization mode comprises a first short-time energization mode and a second short-time energization time mode in which the power supply time period is relatively shorter than that in the first short-time energization mode.

9. The storage controller according to claim 1, wherein the power supply mode setting portion can set, on the basis of the access information about each of the physical storage devices, at least three power supply modes of a long-time energization mode of performing constant energization, a first short-time energization mode in which energization is performed only in a predetermined situation, and a second short-time energization mode in which the power supply time period is relatively shorter than that in the first short-time energization mode, and wherein
the relocation plan creation portion calculates an access frequency to each of the logical storage devices on the basis of the access information about each of the logical storage devices,
(1) when the access frequency calculated for the logical storage device is at least a first threshold which is set in advance, the relocation plan creation portion selects a physical storage device, which is set to the long-time energization mode, as a destination of this logical storage device,
(2) when the access frequency calculated for the logical storage device is between the first threshold and a second threshold which is set in advance (first threshold>second threshold), the relocation plan creation portion selects a physical storage device, which is set to the first short-time energization mode, as a destination of this logical storage device, and
(3) when the access frequency calculated for the logical storage device is less than the second threshold, the relocation plan creation portion selects a physical storage device, which is set to the second short-time energization mode, as a destination of this logical storage device.

10. The storage controller according to claim 1, wherein the power control portion stops supply of power to each of the storage devices configuring a physical storage device which is not accessed for a predetermined amount of time or longer, on the basis of the access information about each of the physical storage devices.

11. The storage controller according to claim 1, wherein, when an access to a physical storage device that is no longer supplied with power is detected, the power control portion supplies power to each of the storage devices configuring the physical storage device.

12. The storage controller according to claim 1, wherein the execution time determination portion refers to the access information about the source physical storage device and the access information about the destination physical storage device to detect a low load time zone in which the access frequency to the source physical storage device and the destination physical storage device becomes relatively low, and then sets the execution time in the detected low load time zone.

13. The storage controller according to claim 12, wherein the execution time determination portion sets an execution time in a common time zone in which a low load time zone related to the source physical storage device and a low load time zone related to the destination physical storage device overlap each other, the common time zone being a time zone which has a length equal to or longer than a transfer time period required for transferring the data stored in the logical storage device which is a target of relocation.

14. The storage controller according to claim 4, wherein, in the case of generating a new logical storage device, the physical storage device which is set to the long-time energization mode is selected.

15. The storage controller according to claim 1, wherein, when specification information for specifying a type of physical storage device to which a logical storage device should belong is set for the logical storage device, a physical storage device in which the logical storage device is disposed is fixed to a physical storage device having the power supply mode which is indicated in the specification information.

16. The storage controller according to claim 4, wherein, when specification information, which is used for fixing a destination for disposing the logical storage device to the physical storage device which is set to the long-time energization mode, is previously set in the logical storage device, the relocation plan creation portion fixes the destination for disposing the logical storage device in which the specification information is set, to the physical storage device, which is set to the long-time energization mode, so that the logical storage device does not move to the physical storage device that is set to the short-time energization mode.

17. The storage controller according to claim 16, the specification information can be set from an external computer terminal.

18. A method of controlling a storage controller which is connected to at least one host device and a plurality of storage devices, wherein the storage controller is provided with:
a plurality of physical storage devices, each of which is configured from storage regions of a predetermined number of storage devices among the plurality of storage devices; and
at least one logical storage device which can be set in the storage region of each of the physical storage devices,
and wherein the method comprises the steps of:
processing an access request for accessing each of the logical storage devices from the host device in response to a command received from the host device;
collecting access information about each of the physical storage devices and about each of the logical storage devices on the basis of the access request;
setting a power supply mode for supplying power for each of the physical storage devices on the basis of the access information about each of the physical storage devices;
controlling supply of power to each of the storage devices configuring each of the physical storage devices, on the basis of the set power supply mode;
creating a relocation plan for moving each of the logical storage devices between the physical storage devices having different power supply modes, on the basis of the access information about each of the logical storage devices;
setting an execution time for executing the created relocation plan; and
moving a logical storage device, which is judged as a target of relocation from among the logical storage devices, from a source physical storage device to a destination physical storage device on the basis of the created relocation plan, when the determined execution time comes, wherein (1) the setting a power supply mode comprises calculating an access frequency to each of the physical storage devices on the basis of the access information about each of the physical storage devices, (1-1) setting a long-time energization mode in which a power supply time period is relatively long, for each of the storage devices configuring the physical storage device in which the calculated access frequency is relatively high, and (1-2) setting a short-time energization mode in which a power supply time period is relatively short, for each of the storage devices configuring the physical storage device in which the calculated access frequency is relatively low, (2) the relocation plan creation portion comprises calculating an access frequency to each of the logical storage devices on the basis of the access information about each of the logical storage devices, to create a relocation plan by:

(2-1) selecting a physical storage device, which is set to the long-time energization mode, as a destination of the logical storage device in which the calculated access frequency is relatively high; and (2-2) selecting a physical storage device, which is set to the short-time energization mode, as a destination of the logical storage device in which the calculated access frequency is relatively low.

19. A storage controller, comprising:

a host communication interface portion for carrying out communication between the storage controller and a host device;

a sub communication interface portion for carrying out communication between the storage controller and a plurality of storage devices;

a control portion which controls data exchange between the host device and each of the storage devices by using the host communication interface portion and the sub communication interface portion;

a plurality of physical storage devices, each of which is configured from storage regions of a predetermined number of storage devices among the plurality of storage devices; and at least one logical storage device which can be set in the storage region of each of the physical storage devices, wherein (1) the control portion comprises:

(1-1) an access information collection portion which collects access information about each of the physical storage devices and each of the logical storage devices on the basis of the status of access to each of the logical storage devices from the host device;

(1-2) a power supply mode setting portion which sets a power supply mode for supplying power for each of the physical storage devices on the basis of the access information about each of the physical storage devices;

(1-3) a power control portion which controls supply of power to each of the storage devices configuring each of the physical storage devices, on the basis of the set power supply mode;

(1-4) a relocation plan creation portion which creates a relocation plan for moving each of the logical storage devices between the physical storage devices having different power supply modes, on the basis of the access information about each of the logical storage devices;

(1-5) an execution time determination portion which sets an execution time for executing the created relocation plan; and (1-6) a relocation execution portion which moves a logical storage device, which is judged as a target of relocation from among the logical storage devices, from a source physical storage device to a destination physical storage device on the basis of the created relocation plan, when the determined execution time comes, and wherein (2) the power supply mode setting portion calculates an access frequency to each of the physical storage devices on the basis of the access information about each of the physical storage devices, (2-1) sets a long-time energization mode in which a power supply time period is relatively long, for each of the storage devices configuring the physical storage device in which the calculated access frequency is relatively high, and (2-2) sets a short-time energization mode in which a power supply time period is relatively short, for each of the storage devices configuring the physical storage device in which the calculated access frequency is relatively low, (3) the relocation plan creation portion calculates an access frequency to each of the logical storage devices on the basis of the access information about each of the logical storage devices, to create a relocation plan by:

(3-1) selecting a physical storage device, which is set to the long-time energization mode, as a destination of the logical storage device in which the calculated access frequency is relatively high;

(3-2) selecting a physical storage device, which is set to the short-time energization mode, as a destination of the logical storage device in which the calculated access frequency is relatively low; and (3-3) when there are a plurality of physical storage devices with a power supply mode, which are selected as the destination, selecting, from the plurality of physical storage devices, a physical storage device having an access pattern which matches most with an access pattern for accessing the logical storage device, on the basis of the access information about each of the physical storage devices and the access information about each of the logical storage devices, (4) the power control portion:

(4-1) stops supply of power to each of the storage devices configuring a physical storage device which is not accessed for a predetermined amount of time or longer, on the basis of the access information about each of the physical storage devices, and, (4-2) supplies power to each of the storage devices configuring the physical storage device when an access to the physical storage device which is no longer supplied with power is detected, and (5) the execution time determination portion refers to access information about the source physical storage device and access information about the destination physical storage device to set an execution time in a common time zone in which a low load time zone related to the source physical storage device and a low load time zone related to the destination physical storage device overlap each other, the common time zone being a time zone which has a length equal to or longer than a transfer time period required for transferring the data stored in the logical storage device which is a target of relocation.

* * * * *